United States Patent
Seen et al.

(10) Patent No.: US 10,007,381 B2
(45) Date of Patent: Jun. 26, 2018

(54) MOBILE TERMINAL

(71) Applicant: LG ELECTRONICS INC., Seoul (KR)

(72) Inventors: Seungmin Seen, Seoul (KR); Seongcheol Lee, Seoul (KR); Gunseek Oh, Seoul (KR); Sangjo Ryu, Seoul (KR); Jeongwoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/397,265

(22) Filed: Jan. 3, 2017

(65) Prior Publication Data

US 2017/0192598 A1 Jul. 6, 2017

(30) Foreign Application Priority Data

Jan. 4, 2016 (KR) .................. 10-2016-0000597

(51) Int. Cl.
*G06F 3/041* (2006.01)
*F21V 8/00* (2006.01)

(52) U.S. Cl.
CPC ......... *G06F 3/0416* (2013.01); *G02B 6/0031* (2013.01); *G02B 6/0053* (2013.01);
(Continued)

(58) Field of Classification Search
CPC .............. G06F 3/0416; G06F 3/0412; G06F 2203/04102; G06F 2203/04107;
(Continued)

(56) References Cited

U.S. PATENT DOCUMENTS 8,282,260 B2 * 10/2012 Kim .................. G02B 6/0046
  362/615
8,662,729 B2 * 3/2014 Oh .................... G02B 6/0021
  362/235

(Continued)

FOREIGN PATENT DOCUMENTS

CN 204740413 U 11/2015
EP 3065124 A1 9/2016
(Continued)

*Primary Examiner* — Afroza Chowdhury
(74) *Attorney, Agent, or Firm* — Birch, Stewart, Kolasch & Birch, LLP

(57) ABSTRACT

A mobile terminal including a light guide plate; a plurality of light sources disposed on at least one side of the light guide plate; a display positioned on a front surface of the light guide plate; and a controller configured to control the display to operate in one of operation states including a first state, in which all of the plurality of light sources are activated such that an entire portion of the display is illuminated, and a second state, in which at least one light source corresponding to a partial portion of the display among the plurality of light sources is selectively activated such that the partial portion of the display is illuminated, perform an operation in accordance with a first touch input applied to the partial portion of the display in the second state, and not perform an operation in accordance with a second touch input applied to a remaining portion excluding the partial portion of the display in the second state.

24 Claims, 27 Drawing Sheets

(52) U.S. Cl.
CPC .......... *G02B 6/0083* (2013.01); *G02B 6/0088* (2013.01); *G06F 3/0412* (2013.01); *G06F 2203/04102* (2013.01); *G06F 2203/04107* (2013.01)

(58) Field of Classification Search
CPC .. G02B 6/0031; G02B 6/0053; G02B 6/0083; G02B 6/0088
See application file for complete search history.

(56) References Cited

U.S. PATENT DOCUMENTS

| | | | |
|---|---|---|---|
| 8,957,844 B2* | 2/2015 | Sim | F21V 7/22 345/102 |
| 9,448,355 B2* | 9/2016 | Urano | G02B 6/0068 |
| 2006/0208993 A1* | 9/2006 | Jung | G06F 1/1616 345/98 |
| 2006/0291240 A1 | 12/2006 | Kim et al. | |
| 2007/0052662 A1* | 3/2007 | Kim | G02F 1/133605 345/102 |
| 2007/0146344 A1 | 6/2007 | Martin et al. | |
| 2007/0188677 A1* | 8/2007 | Souk | G02B 6/0068 349/65 |
| 2008/0123033 A1* | 5/2008 | Grip | G02F 1/133555 349/114 |
| 2008/0180972 A1* | 7/2008 | Sakamoto | G02B 6/009 362/613 |
| 2009/0267506 A1 | 10/2009 | Matsumoto et al. | |
| 2010/0026931 A1* | 2/2010 | Yokoyama | G02F 1/133605 349/62 |
| 2010/0045621 A1 | 2/2010 | Kang et al. | |
| 2011/0037920 A1* | 2/2011 | Kim | G02F 1/133608 349/58 |
| 2011/0115757 A1* | 5/2011 | Kim | G06F 3/042 345/204 |
| 2012/0169637 A1 | 7/2012 | Jeong et al. | |
| 2012/0206501 A1* | 8/2012 | Jang | G09G 3/342 345/690 |
| 2012/0314445 A1* | 12/2012 | Masuda | G02B 6/0008 362/581 |
| 2013/0016523 A1* | 1/2013 | Urano | G02B 6/0068 362/602 |
| 2013/0111415 A1 | 5/2013 | Newman et al. | |
| 2013/0121027 A1* | 5/2013 | Minami | H04N 13/0411 362/613 |
| 2014/0096053 A1 | 4/2014 | Lee et al. | |
| 2015/0082255 A1 | 3/2015 | Devries et al. | |
| 2015/0293405 A1* | 10/2015 | Park | G02F 1/133608 349/69 |
| 2015/0356925 A1* | 12/2015 | Lee | G09G 3/3266 345/212 |
| 2016/0088148 A1 | 3/2016 | Kim et al. | |

FOREIGN PATENT DOCUMENTS

| | | |
|---|---|---|
| JP | 2012-109104 A | 6/2012 |
| JP | 2014-137961 A | 7/2014 |
| KR | 10-2007-0016512 A | 2/2007 |
| KR | 10-2007-0119227 A | 12/2007 |
| KR | 10-2010-0023602 A | 3/2010 |
| KR | 10-2010-0131093 A | 12/2010 |
| KR | 10-1004307 B1 | 12/2010 |
| KR | 10-2011-0129574 A | 12/2011 |
| KR | 10-2012-0079398 A | 7/2012 |
| KR | 10-2013-0133569 A | 12/2013 |
| KR | 10-2014-0043644 A | 4/2014 |
| KR | 10-2014-0090715 A | 7/2014 |
| KR | 10-2015-0018349 A | 2/2015 |
| WO | WO 2009/076974 A1 | 6/2009 |

* cited by examiner (a)

(b)

MOBILE TERMINAL

CROSS REFERENCE TO THE RELATED APPLICATIONS

This application claims the priority benefit of Korean Patent Application No. 10-2016-0000597 filed on Jan. 4, 2016, the entire contents of which are incorporated herein by reference for all purposes as if fully set forth herein.

BACKGROUND OF THE INVENTION

Field of the Invention

The present disclosure relates to a mobile terminal efficiently using a resource.

Discussion of the Related Art

Terminals may be generally classified into mobile/portable terminals and stationary terminals. The mobile terminals may also be classified into handheld terminals and vehicle mounted terminals.

Mobile terminals have increasingly more functions. Examples of the functions include data and voice communications, capturing images and video using a camera, recording audio, playing music files using a speaker system, and displaying images and video on a display. Some mobile terminals include additional functionality which supports game playing, while other terminals are configured as multimedia players. More recently, the mobile terminals have been configured to receive broadcast and multicast signals which permit viewing of content such as videos and television programs.

As the mobile terminals have increasingly more functions, the mobile terminals have been implemented as multimedia players of multiple functions having capturing images and video, playing music files or video, game playing, receiving broadcast, etc. Efforts are ongoing to support and increase the functionality of mobile terminals. Such efforts include software and hardware improvements, as well as changes and improvements in the structural components. However, the resources of the mobile terminal are not used efficiently.

SUMMARY OF THE INVENTION

Accordingly, an object of the present disclosure is to address the above-described and other problems.

Another aspect of the present disclosure is to provide a mobile terminal capable of efficiently using a resource.

In one aspect, there is provided a mobile terminal including a light guide plate; a plurality of light sources disposed on at least one side of the light guide plate; a display positioned on a front surface of the light guide plate; and a controller configured to control the display to operate in one of operation states including a first state, in which an image is displayed on an entire portion of the display, and a second state, in which an image is displayed on a portion of the display, control the display to activate all of the plurality of light sources in the first state and to selectively activate at least one light source corresponding to the portion of the display among the plurality of light sources in the second state, perform an operation in accordance with a first touch input applied to the portion of the display in the second state, and not perform an operation in accordance with a second touch input applied to a remaining portion except the portion of the display in the second state.

In another aspect, there is provided a mobile terminal including a light guide plate; a plurality of light sources disposed on at least one side of the light guide plate; a display positioned on a front surface of the light guide plate; and a controller configured to control the display to operate in one of operation states including a first state, in which an image is displayed on an entire portion of the display, and a second state, in which an image is displayed on a portion of the display, and control the display to activate all of the plurality of light sources in the first state and to selectively activate at least one light source corresponding to the portion of the display among the plurality of light sources in the second state, wherein the light guide plate includes a plurality of light guide portions that is compartmentalized from the light guide plate to form a plurality of regions.

In yet another aspect, there is provided a mobile terminal including a light guide plate; a plurality of light sources disposed on at least one side of the light guide plate; a display positioned on a front surface of the light guide plate; and a controller configured to control the display to operate in one of operation states including a first state, in which an image is displayed on an entire portion of the display, and a second state, in which an image is displayed on a portion of the display, and control the display to activate all of the plurality of light sources in the first state and to selectively activate at least one light source corresponding to the portion of the display among the plurality of light sources in the second state, wherein the at least one side of the light guide plate is a side of the light guide plate closest to the portion of the display.

In still yet another aspect, there is provided a mobile terminal including a light guide plate; a plurality of light sources disposed on at least one side of the light guide plate; a display positioned on a front surface of the light guide panel; a touch controller including a touch memory and a frame buffer; and a controller configured to control the display to operate in one of operation states including a first state, in which an image is displayed on an entire portion of the display, and a second state, in which an image is displayed on a portion of the display, and control the display to activate all of the plurality of light sources in the first state, and selectively activate at least one light source corresponding to the portion of the display among the plurality of light sources in the second state, wherein the touch controller is configured to display an image on the portion of the display in the second state while the controller is inactivated.

According to at least one aspect of the present disclosure, the present disclosure can efficiently use a resource of the mobile terminal.

Additional features and advantages of the invention will be set forth in the description which follows, and in part will be apparent from the description, or may be learned by practice of the invention. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1A:
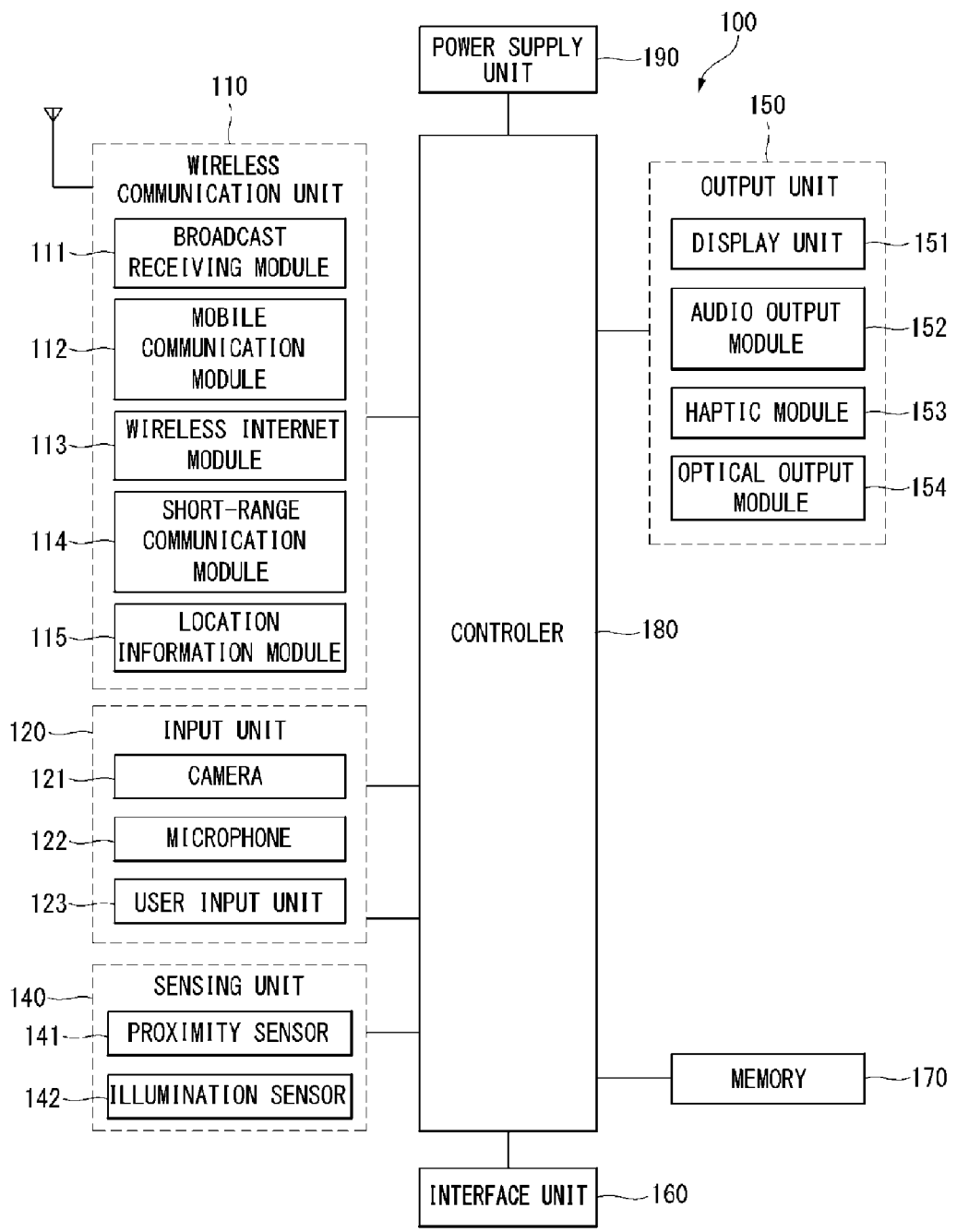
FIG. 1A is a block diagram of a mobile terminal related to an embodiment of the invention.

Reference will now be made in detail embodiments of the invention examples of which are illustrated in the accompanying drawings. Since the present invention can be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed. When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context. In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following embodiments of the present invention are provided to those skilled in the art in order to describe the present invention more completely. Accordingly, shapes and sizes of elements shown in the drawings may be exaggerated for clarity.

Mobile terminals disclosed herein may be implemented using a variety of different types of devices. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of mobile terminals, such as those types noted above. In addition, these teachings may also be applied to stationary terminals such as digital TV, desktop computers, and the like.

Figure 1B:
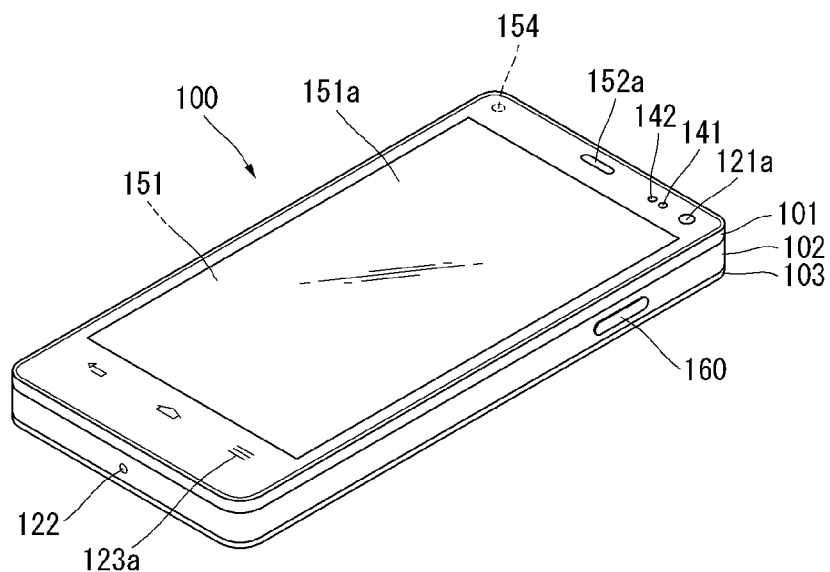
FIGS. 1B and 1C are conceptual views of an example of a mobile terminal related to an embodiment of the invention, viewed from different directions.
Figure 1C:
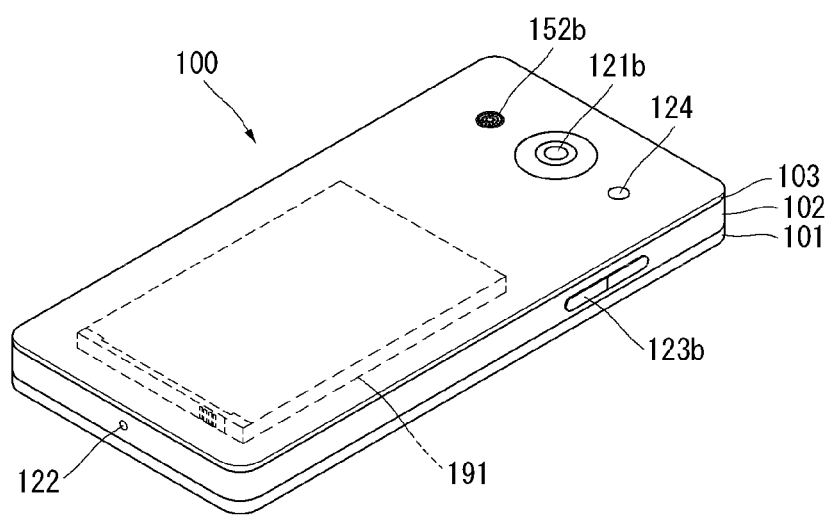

Reference is now made to FIGS. 1A to 1C, where FIG. 1A is a block diagram of a mobile terminal related to an embodiment of the invention, and FIGS. 1B and 1C are conceptual views of an example of a mobile terminal related to an embodiment of the invention, viewed from different directions.

A mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having the wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 can be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 can have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 can perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the device body, or configured to be detachable from the device body.

At least some of the above components may be combined with one another and operate, in order to implement an operation, a control, or a control method of a mobile terminal according to various embodiments described below. Further, an operation, a control, or a control method of a mobile terminal according to various embodiments may be implemented by an execution of at least one application program stored in the memory 170.

Referring now to FIGS. 1B and 1C, the mobile terminal 100 according to the embodiment of the invention is described with reference to a bar-type terminal body. However, the mobile terminal 100 can alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

In the embodiment disclosed herein, a body (hereinafter, referred to as "terminal body") of the mobile terminal 100 can be understood as regarding the mobile terminal 100 as at least one assembly. The mobile terminal 100 can generally include a case (for example, frame, housing, cover, and the like) forming an appearance of the terminal. In this embodiment, the case is formed using a front case 101 and a back case 102. Various electronic components are incorporated into a space formed between the front case 101 and the back case 102. At least one middle case may be additionally positioned between the front case 101 and the back case 102.

The display unit 151 is located on the front side of the terminal body to output information. As illustrated, a window 151a of the display unit 151 can be mounted to the front case 101 to form a front surface of the terminal body together with the front case 101.

In some embodiments, electronic components may also be mounted to the back case 102. Examples of such electronic components include a detachable battery, an identification module, a memory card, and the like. A back cover 103 is shown covering the electronic components, and this cover may be detachably coupled to the back case 102.

Therefore, when the back cover 103 is detached from the back case 102, the electronic components mounted to the back case 102 are externally exposed.

As illustrated, when the back cover 103 is coupled to the back case 102, a side surface of the back case 102 is partially exposed. In some cases, upon the coupling, the back case 102 may also be completely shielded by the back cover 103. In some embodiments, the back cover 103 may include an opening for externally exposing a camera 121b or an audio output module 152b.

The cases 101, 102, 103 can be formed by injection-molding synthetic resin or can be formed of a metal, for example, stainless steel (STS), aluminum (Al), titanium (Ti), or the like. As an alternative to the example in which the plurality of cases form an inner space for accommodating components, the mobile terminal 100 can be configured such that one case forms the inner space. In this example, a mobile terminal 100 having a uni-body is formed so synthetic resin or metal extends from a side surface to a back surface.

If desired, the mobile terminal 100 can include a waterproofing unit for preventing introduction of water into the terminal body. For example, the waterproofing unit may include a waterproofing member which is located between the window 151a and the front case 101, between the front case 101 and the back case 102, or between the back case 102 and the back cover 103, to hermetically seal an inner space when those cases are coupled.

The mobile terminal 100 can include the display unit 151, first and second audio output modules 152a and 152b, a proximity sensor 141, an illumination sensor 142, an optical output module 154, first and second cameras 121a and 121b, first and second manipulation units 123a and 123b, a microphone 122, and an interface unit 160.

FIGS. 1B and 1C illustrate that the display unit 151, the first audio output module 152a, the proximity sensor 141, the illumination sensor 142, the optical output module 154, the first camera 121a, and the first manipulation unit 123a are disposed on the front surface of the terminal body; the second manipulation unit 123b, the microphone 122, and the interface unit 160 are disposed on the side surface of the terminal body; and the second audio output module 152b and the second camera 121b are disposed on the back surface of the terminal body, as an example.

FIGS. 1B and 1C depict certain components as arranged on the mobile terminal. However, alternative arrangements are possible and within the teachings of the present invention. Some components may be omitted or rearranged. For example, the first manipulation unit 123a may be located on another surface of the terminal body, and the second audio output module 152b may be located on the side surface of the terminal body.

The display unit 151 outputs (displays) information processed in the mobile terminal 100. For example, the display unit 151 can display execution screen information of an application program executing at the mobile terminal 100 or user interface (UI) and graphic user interface (GUI) information in response to the execution screen information.

The display unit 151 can be implemented using one or more suitable display devices. Examples of such suitable display devices include a liquid crystal display (LCD), a thin film transistor-liquid crystal display (TFT-LCD), an organic light emitting diode (OLED) display, a flexible display, a 3-dimensional (3D) display, an e-ink display, and combinations thereof.

The display unit 151 can be implemented using two display devices, which can implement the same or different display technology. For instance, a plurality of the display units 151 can be arranged on one side, either spaced apart from each other, or these devices may be integrated, or these devices may be arranged on different surfaces.

The display unit 151 can also include a touch sensor which senses a touch input received at the display unit. When a touch is input to the display unit 151, the touch sensor may be configured to sense this touch and the controller 180 (see FIG. 1A), for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a back surface of the window 151a, or a metal wire which is patterned directly on the back surface of the window 151a. Alternatively, the touch sensor may be integrally formed with the display. For example, the touch sensor may be disposed on a substrate of the display or within the display.

The display unit 151 can also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented as a receiver for transferring a call sound to a user's ear. The second audio output module 152b may be implemented as a speaker outputting voice audio, alarm sounds, multimedia audio reproduction, and the like.

The window 151a of the display unit 151 can typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller 180 can control the optical output unit 154 so that the output of light stops.

The first camera 121a can process image frames such as still or moving images obtained by the image sensor in a capture mode or a video call mode. The processed image frames can then be displayed on the display unit 151 or stored in a memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a back input unit may be located on the back surface of the terminal body. The back input unit can be manipulated by a user to provide input to the mobile terminal 100. The input may be used in a variety of different ways. For example, the back input unit may be used by the user to provide an input for power on/off, start, end, scroll, control volume level being output from the first or second audio output modules 152a or 152b, switch to a touch recognition mode of the display unit 151, and the like. The back input unit may be configured to permit touch input, a push input, or combinations thereof.

The back input unit may be located to overlap the display unit 151 of the front side in a thickness direction of the terminal body. As an example, the back input unit may be located on an upper end portion of the back side of the terminal body such that the user can easily manipulate it using a forefinger when the user grabs the terminal body with one hand. Alternatively, the back input unit can be positioned at most any location of the back side of the terminal body.

Embodiments that include the back input unit may implement some or all of the functionality of the first manipulation unit 123a in the back input unit. As such, in situations where the first manipulation unit 123a is omitted from the front side, the display unit 151 can have a larger screen.

As a further alternative, the mobile terminal 100 can include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123. The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the back side of the terminal body and includes an image capturing direction that is substantially opposite to the image capturing direction of the first camera unit 121a. If desired, the second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna can be formed using a film attached to an inner surface of the back cover 103, or a case that includes a conductive material.

The power supply unit 190 (see FIG. 1A) for supplying power to the mobile terminal 100 can include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. The wireless charging may be implemented by magnetic induction or electromagnetic resonance.

The back cover 103 is shown coupled to the back case 102 for shielding the battery 191, to prevent separation of the battery 191, and to protect the battery 191 from an external impact or from foreign material. When the battery 191 is detachable from the terminal body, the back case 103 may be detachably coupled to the back case 102.

An accessory for protecting an appearance or assisting or extending the functions of the mobile terminal 100 can also be provided for the mobile terminal 100. As an example of the accessory, a cover or a pouch for covering or accommodating at least one surface of the mobile terminal 100 can be provided. The cover or the pouch may cooperate with the display unit 151 to extend the function of the mobile terminal 100. Another example of the accessory is a touch pen for assisting or extending a touch input to a touch screen.

In the embodiment of the invention, information processed in the mobile terminal 100 can be displayed using the flexible display. This is described in detail below.

Figure 2:
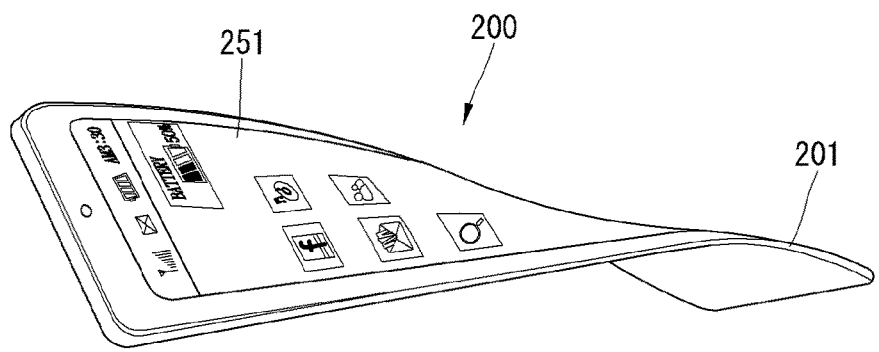
FIG. 2 is a conceptual view of another example of a transformable mobile terminal according to an embodiment of the invention.

FIG. 2 is a conceptual view of another example of a transformable mobile terminal according to the embodiment of the invention. As shown in FIG. 2, a mobile terminal 200 is shown having a display unit 251, which can be transformably configured by an external force. This transformation, which includes the display unit 251 and other components of the mobile terminal 200, may include any of curving, bending, folding, twisting, rolling, and combinations thereof. The transformable display unit 251 may also be referred to as a "flexible display unit." In some implementations, the flexible display unit 251 may include a general flexible display, electronic paper (also known as e-paper), and combinations thereof. In general, the mobile terminal 200 may be configured to include features that are the same as or similar to that of the mobile terminal 100 of FIGS. 1B and 1C.

The flexible display of the mobile terminal 200 is generally formed as a lightweight, non-fragile display, which still exhibits characteristics of an existing flat panel display, but is instead fabricated on a flexible substrate which can be transformed as noted previously. The term e-paper may be used to refer to a display technology employing the characteristic of a general ink, and is different from the existing flat panel display in view of using reflected light. E-paper is generally understood as changing displayed information using a twist ball or via electrophoresis using a capsule.

When the flexible display unit 251 is not transformed (for example, in a state with an infinite radius of curvature and referred to as a first state), a display region of the flexible display unit 251 includes a generally flat surface. When the flexible display unit 251 is transformed from the first state by an external force (for example, a state with a finite radius of curvature and referred to as a second state), the display region may become a curved surface or a bent surface. As shown in FIG. 2, information displayed in the second state can be visual information output on the curved surface. The visual information may be realized so a light emission of each unit pixel (subpixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is transformed into the flat state (or a less curved state) or into a more curved state.

If desired, the flexible display unit 251 may implement a flexible touch screen using a touch sensor in combination with the display. When a touch is received at the flexible touch screen, the controller 180 (see FIG. 1A) can execute certain control corresponding to the touch input. In general, the flexible touch screen is configured to sense touch and other input while in both the first and second states. One option is to configure the mobile terminal 200 to include a transformation sensor which senses the transforming of the flexible display unit 251. The transformation sensor may be included in the sensing unit 140 (see FIG. 1A).

The transformation sensor may be located in the flexible display unit 251 or a case 201 to sense information related to the transforming of the flexible display unit 251. Examples of such information related to the transforming of the flexible display unit 251 may be a transformed direction, a transformed degree, a transformed position, a transformed amount of time, an acceleration that the transformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, the controller 180 or other component can change information displayed on the flexible display unit 251, or generate a control signal for controlling a function of the mobile terminal 200, based on the information related to the transforming of the flexible display unit 251. Such information is typically sensed by the transformation sensor.

The mobile terminal 200 is shown having the case 201 for accommodating the flexible display unit 251. The case 201 can be transformable together with the flexible display unit 251, taking into account the characteristics of the flexible display unit 251.

A battery located in the mobile terminal 200 may also be transformable in cooperation with the flexible display unit 261, taking into account the characteristic of the flexible display unit 251. One technique to implement such a battery is to use a stack and folding method of stacking battery cells.

The transformation of the flexible display unit 251 is not limited to transforming from an external force. For example, the flexible display unit 251 can be transformed into the second state from the first state by a user command, application command, or the like.

Figure 3:
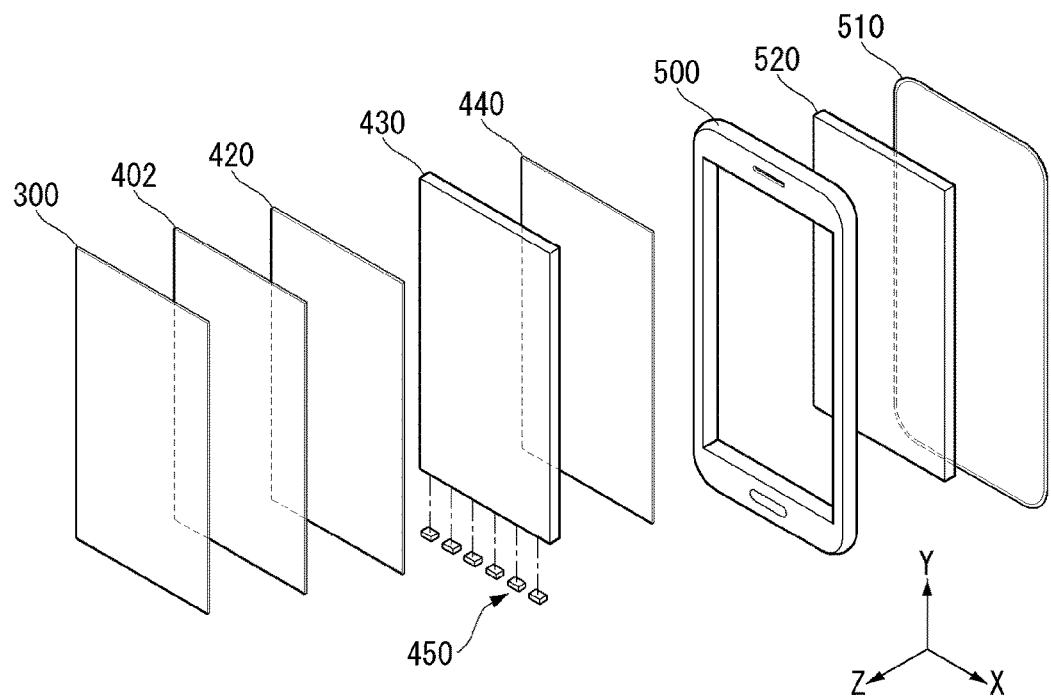
FIG. 3 is an exploded perspective view of a mobile terminal according to an embodiment of the invention.

FIG. 3 is an exploded perspective view of a mobile terminal according to an embodiment of the invention. In FIG. 3, a front surface of the mobile terminal faces a Z-axis direction; a Y-axis direction indicates an upper part of the mobile terminal; and an X-axis direction indicates one side direction of the mobile terminal.

A mobile terminal 100 according to an embodiment of the invention can include a glass 300, a touch sensor 402, an optical sheet 420, a light guide plate 430, a reflective sheet 440, a frame 500, a back cover 510, and a printed circuit board (PCB) 520.

The glass 300 may be positioned at a front surface of the mobile terminal 100. The glass 300 may be made of a transparent material. The glass 300 may be directly touched by a user's finger and may protect an inner configuration of the mobile terminal 100.

The touch sensor 402 may receive a touch operation of the user. The touch sensor 402 may be configured as a pressure sensitive touch sensor or a capacitive touch sensor. The optical sheet 420 may function to uniformalize a luminance. For example, the optical sheet 420 may include a plurality of prism sheets and cause light from light sources 450 to be uniformly emitted to the front.

The light guide plate 430 may diffuse light from the light sources 450 to an entire surface of the light guide plate 430 using a total reflection characteristic. Namely, when the light sources 450 are edge type light sources, light emitted from the light sources 450 positioned at one side of the light guide plate 430 may be totally reflected to the inside of the light guide plate 430 and may be diffused to the entire surface of the light guide plate 430. The diffused light may be emitted toward the optical sheet 420 through an uneven portion on an upper surface of the light guide plate 430.

The reflective sheet 440 may be positioned at a back surface of the light guide plate 430. The reflective sheet 440 may forward reflect light travelling to the back surface of the light guide plate 430. The frame 500 may form an appearance of the mobile terminal 100. The frame 500 can be formed through the molding of a plastic material.

Figure 4:
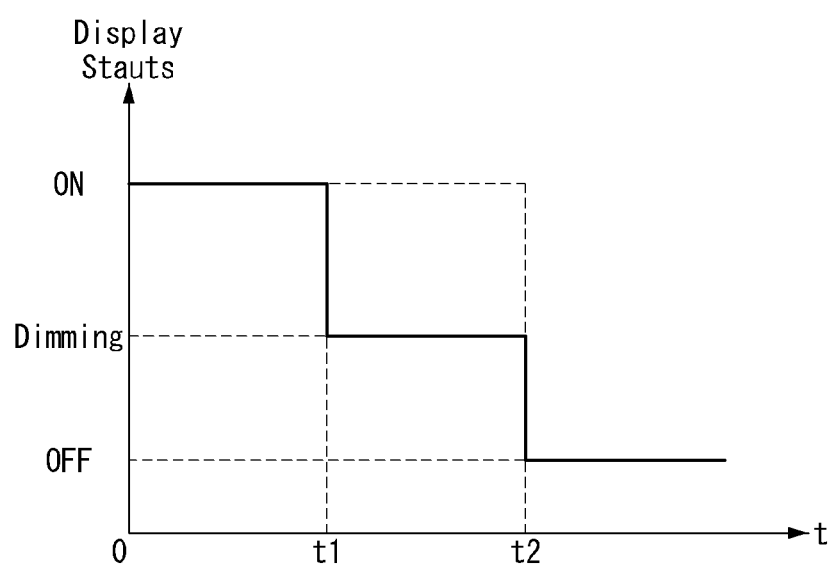
FIGS. 4 and 5 illustrate each state of a mobile terminal.
Figure 5:
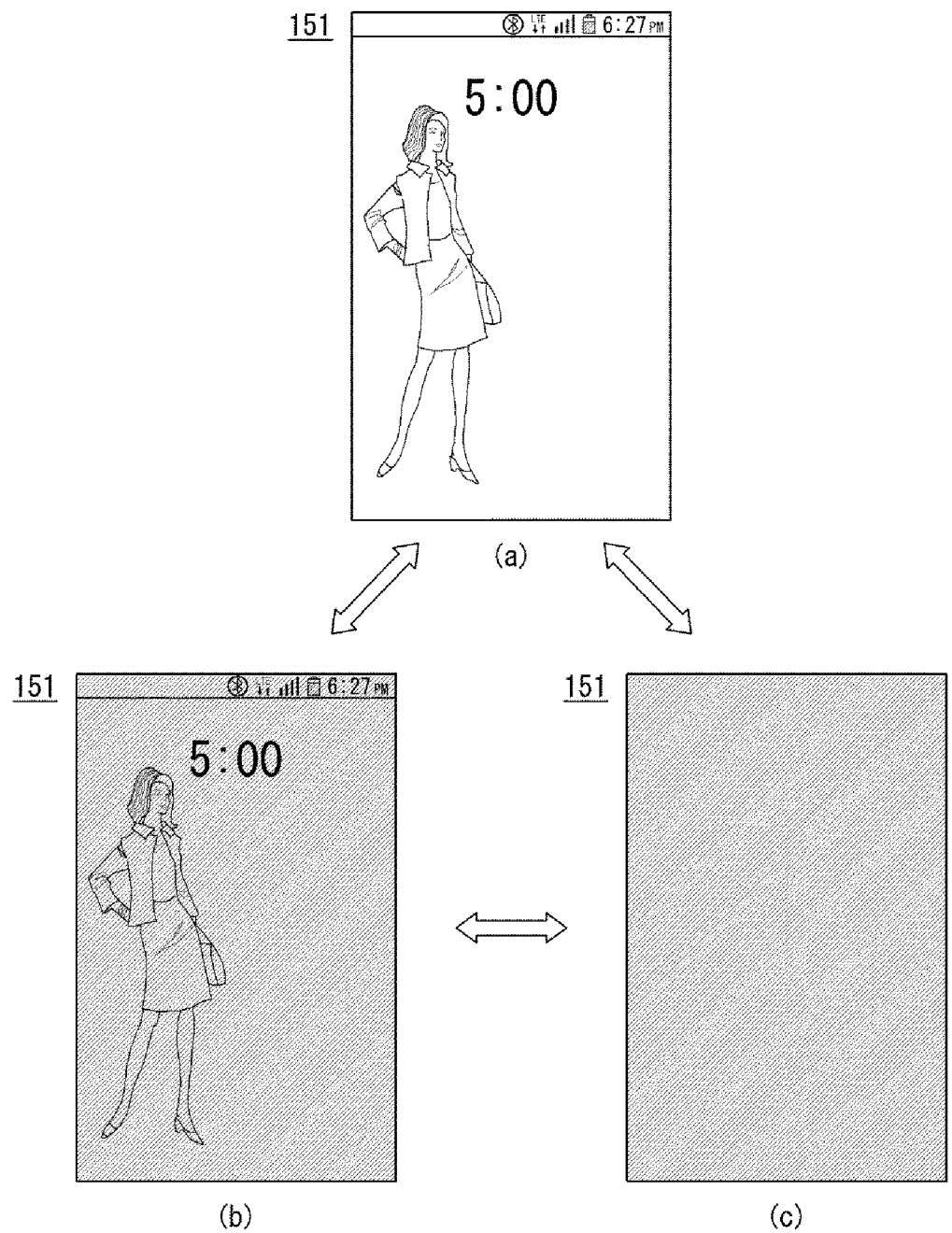

FIGS. 4 and 5 illustrate each state of the mobile terminal. As shown in FIGS. 4 and 5, the mobile terminal 100 according to the embodiment of the invention can be in various states. For example, the controller 180 of the mobile terminal 100 can change a state of the display unit 151 depending on conditions.

As shown in FIG. 4, the display unit 151 can be in a particular state including a first state in which the display unit 151 is turned on, a second state in which the display unit 151 is dimmed, and a third state in which the display unit 151 is turned off. For example, when the display unit 151 needs to be in an activation state by an input of user's operation, etc., the display unit 151 can be in the first state. After a predetermined period of time passed from the first state, the display unit 151 can be changed from the first state to the second state so as to reduce power consumption. When there is no user input for a predetermined period of time from the second state, the display unit 151 can be changed from the second state to the third state so as to further reduce power consumption. Alternatively, the display unit 151 can be changed from the first state to the third state without going through the second state.

As shown in FIG. 5, a display status of the display unit 151 of the mobile terminal 100 can be changed depending on a state of the display unit 151. As shown in (a) of FIG. 5, the display unit 151 can display an image of a first brightness in the first state. The first brightness can be a brightness when a backlight of the mobile terminal 100 operates at a maximum brightness or a brightness close to the maximum brightness. The first brightness can be changed corresponding to a peripheral illuminance.

As shown in (b) of FIG. 5, the display unit 151 can display an image of a second brightness in the second state. The second brightness can be a brightness when the backlight of the mobile terminal 100 is turned off. Further, the second state can be a dimming state. Namely, an image may be entirely displayed on the display unit 151, but the backlight may be turned off.

As shown in (c) of FIG. 5, the display unit 151 can be turned off in the third state. Namely, the display unit 151 can be inactivated. The mobile terminal 100 can be in an input standby state.

Next, FIGS. 6 to 10 illustrate an operation of the mobile terminal according to the embodiment of the invention. As shown in FIGS. 6 to 10, the mobile terminal 100 according to the embodiment of the invention can selectively operate only a predetermined portion of the display unit 151 in an activation state. The mobile terminal 100 according to the embodiment of the invention can selectively respond only to a touch input of the user with respect to an activated area. The mobile terminal 100 according to the embodiment of the invention can minimize power consumption through a minimum activation of the display unit 151.

Figure 6:
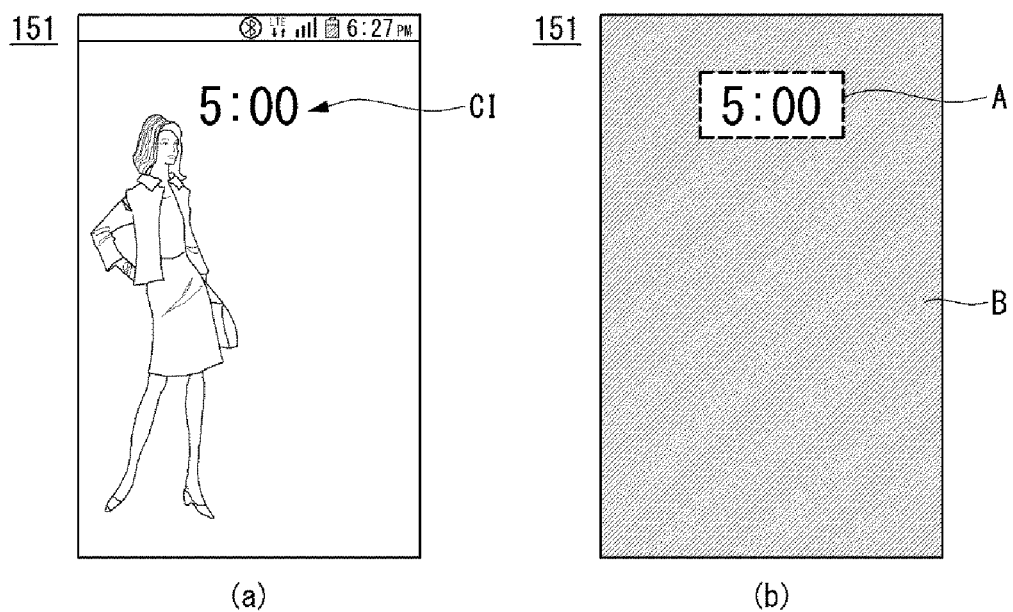
FIGS. 6 to 10 illustrate an operation of a mobile terminal according to an embodiment of the invention.

As shown in (a) of FIG. 6, an entire portion of the display unit 151 can be in an activation state. For example, the entire portion of the display unit 151 can be in the first state. In the first state, the display unit 151 can display an image on its entire portion and can receive a touch input of the user through its entire portion.

As shown in (b) of FIG. 6, the display unit 151 can be in a fourth state in which a portion of the display unit 151 is in the activation state. The fourth state can operate after a predetermined period of time passed from the second state. For example, the display unit 151 can not enter into the third state, in which the display unit 151 is entirely turned off, after the dimming state and enter into the fourth state in which a portion of the display unit 151 is selectively activated.

An activation area A can be a clock area and/or a notification area notifying the reception of a message, etc. In the fourth state, the display unit 151 of the mobile terminal 100 can selectively operate only the activation area A. In other words, only the activation area A can be selectively activated. In other words, a remaining area except the activation area A of the display unit 151 can be inactivated or be in a reduced activation state.

In the fourth state, minimum information the user requires can be provided. The minimum information may be, for example, a time information such as a clock image. Because information can be provided in the fourth state, the fourth state is different from the third state in which the entire portion of the display unit 151 is inactivated. Further, because only a portion of the display unit 151 is activated in the fourth state, the fourth state is different from the first state in which the entire portion of the display unit 151 is activated. Further, because an image is not displayed on an inactivation area B except the activation area A in the fourth state, the fourth state is different from the second state in which only the backlight is entirely inactivated.

The activation area A may be substantially at the same location as a time display area CI, in which time is displayed, when the mobile terminal 100 is in the first state and/or the second state. Thus, even when the display unit 151 changes from the first state or the second state to the third state and at the same time enters into the fourth state to display the activation area A, the user can perceive time information without a sense of difference.

Figure 7:
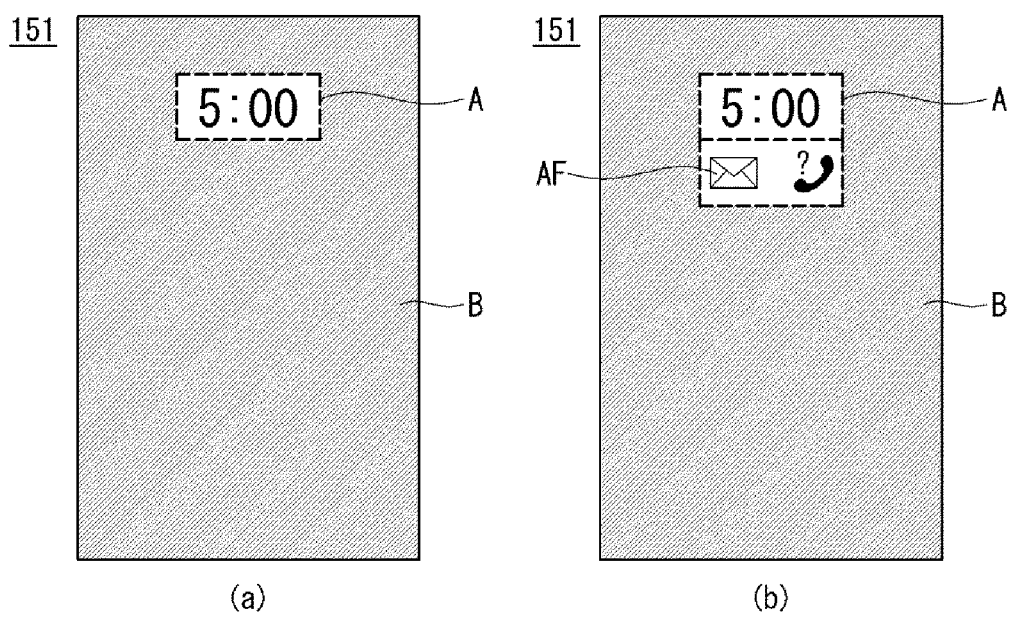

As shown in (a) of FIG. 7, a clock can be displayed in the activation area A. Because the user frequently uses the mobile terminal 100 so as to check a current time, time information of the clock can be helpful for the user. Considering that the user additionally operates the mobile terminal 100 in the third state in which the display unit 151 is entirely turned off and changes from the third state to the first state, the convenience of the user and/or the effective use of a resource of the mobile terminal 100 can be achieved. Namely, the user can check necessary information at any time without an additional operation. For example, when the mobile terminal 100 is in the first state or the second state or even when the mobile terminal 100 enters into the third state, the user can immediately check visual information on the activation area A. Further, because only the activation area A is driven, electric power consumed in the mobile terminal 100 can be minimized in spite of the display of information.

As shown in (b) of FIG. 7, additional information AF can be displayed on the activation area A. The additional information AF may include an event generation including a message reception, a missed call, etc.

The additional information AF may not change a display location of time information that is previously displayed on the activation area A. Namely, a location and/or a size of the visual information may not be changed because of the display of the additional information AF. Thus, the time information, that is basically displayed on the activation area A, may be continuously displayed at a particular location.

Figure 8:
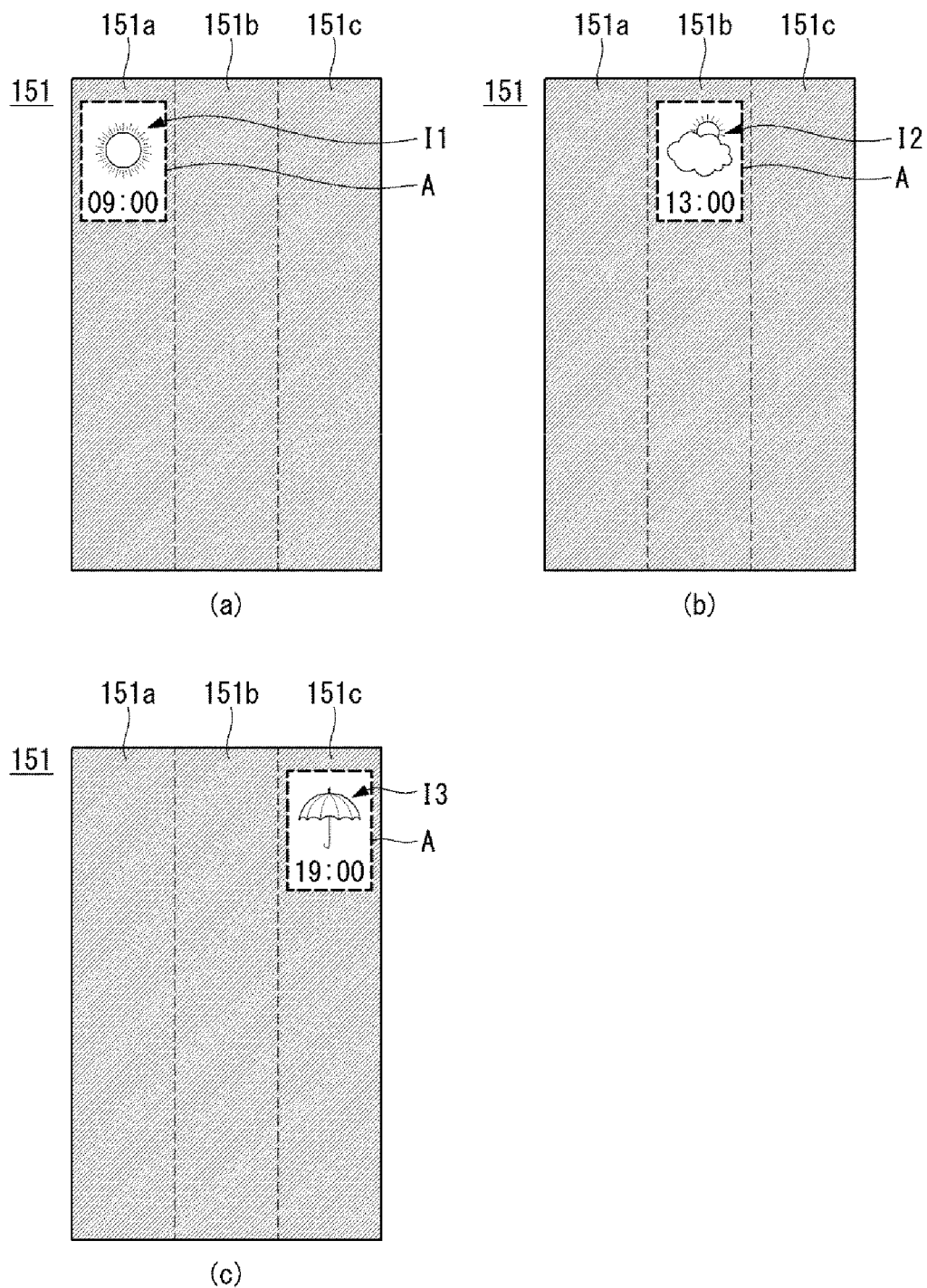

As shown in FIG. 8, a location of the activation area A of the mobile terminal 100 according to the embodiment of the invention can be changed based on a particular criteria. Thus, the user can intuitively perceive a current state based on the particular criteria by checking only the location of the activation area A.

As shown in (a) to (c) of FIG. 8, the activation area A can be displayed in first to third display areas 151a to 151c. The controller 180 can change the location of the activation area A based on particular condition. For example, the particular condition may include a current time. For example, when the current time belongs to the morning, the activation area A can be displayed on the first display area 151a. When the current time belongs to the afternoon, the activation area A can be displayed on the second display area 151b. When the current time belongs to the evening, the activation area A can be displayed on the third display area 151c. The user can intuitively perceive the current state based on the location and/or displayed information of the activation area A changed based on the particular condition.

Figure 9:
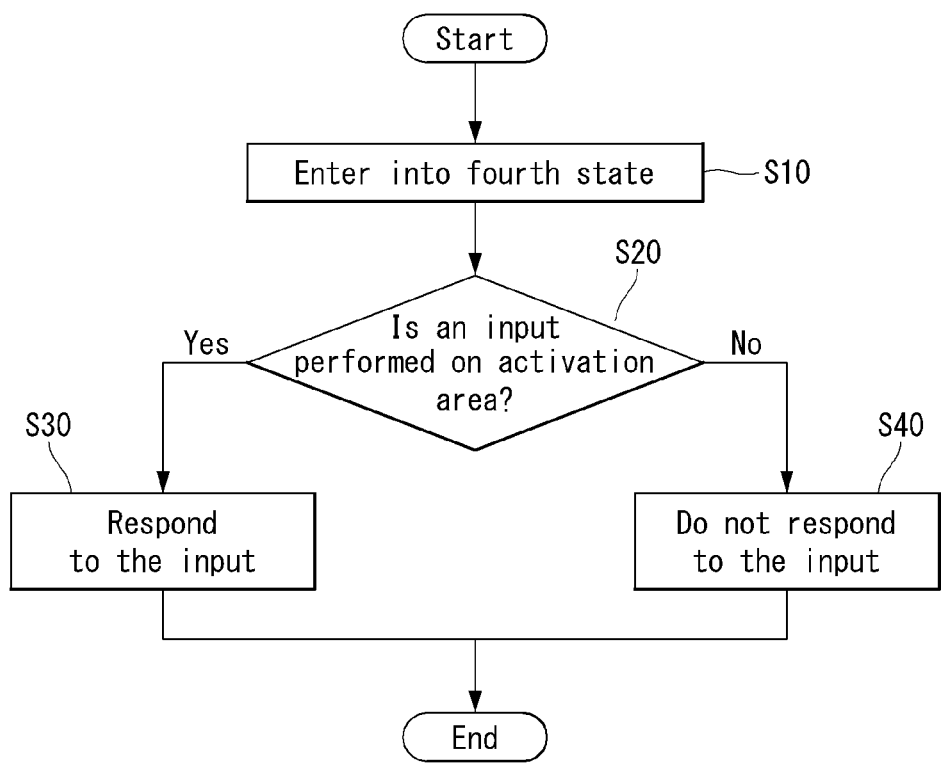

As shown in FIG. 9, the controller 180 of the mobile terminal 100 according to the embodiment of the invention can perform a step S10 of entering into the fourth state. As described above, the fourth state can be performed at the same time as the third state following the first state or the second state or performed instead of the third state. Namely, the fourth state can be included in the third state or may be changed from the first state or the second state without entering into the third state.

In the fourth state, the controller 180 can perform a step S20 of determining whether or not an input is performed on the activation area A. When an input is performed on the activation area A (Yes in S20), the controller 180 can perform a step S30 of responding to the input. When an input is performed on an area other than the activation area A (No in S20), the controller 180 can perform a step S40 of not responding to the input.

Namely, when the user performs a touch input on the activation area A, the controller 180 can perform an operation responding to the touch input. Further, when the user performs a touch input on the inactivation area B, the controller 180 can not perform an operation responding to the touch input.

Figure 10:
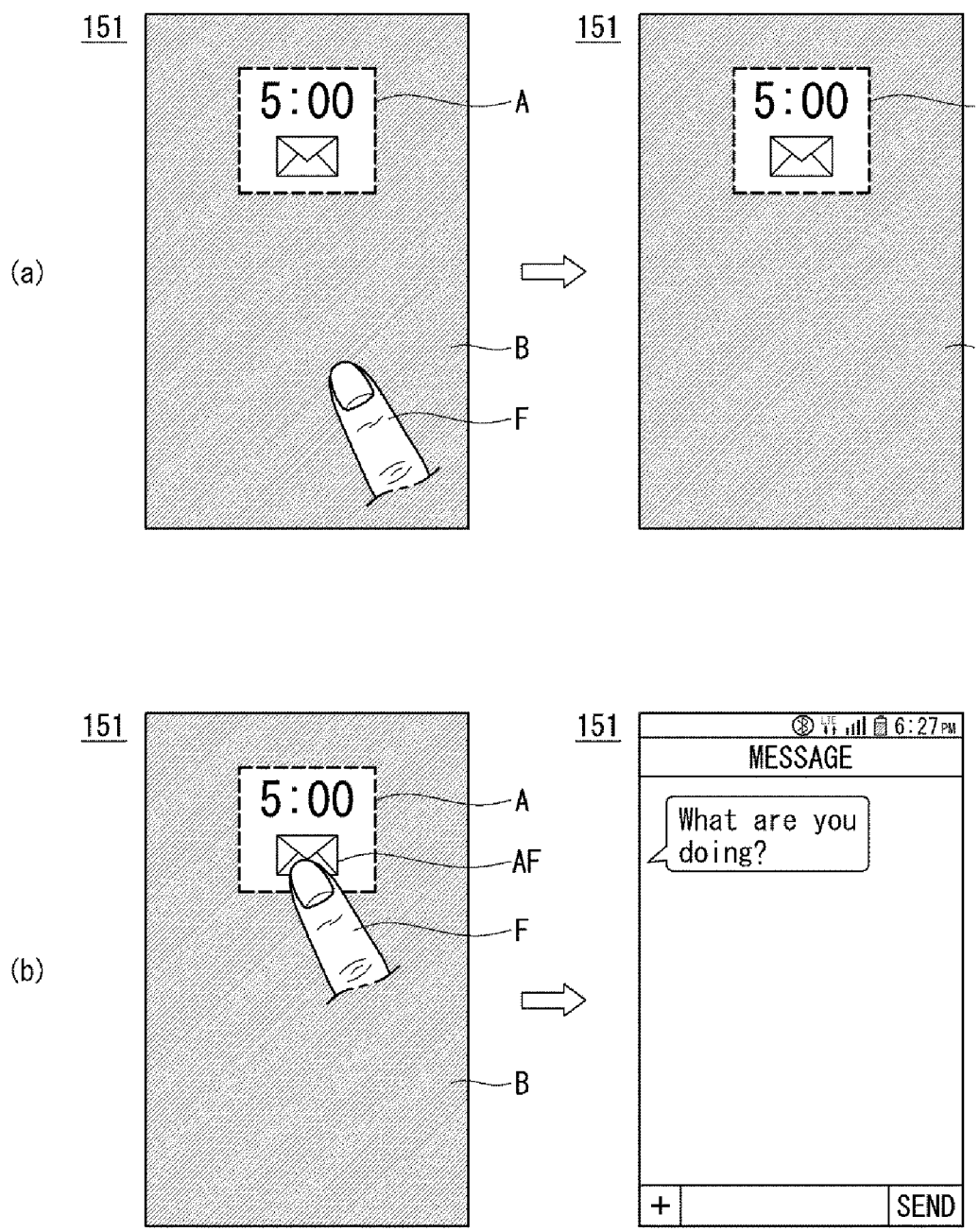

As shown in FIG. 10, the controller 180 can perform different operations depending on a location of a touch input of the user. As shown in (a) of FIG. 10, the activation area A and the inactivation area B can be provided. The user can touch the inactivation area B with his or her finger F.

When the user touches the inactivation area B, the controller 180 does not perform an operation responding to a touch input of the user. Thus, the mobile terminal 10 can be prevented from being entirely activated by an unconscious touch input of the user.

As shown in (b) of FIG. 10, the user can touch the activation area A with his or her finger F. For example, the user can touch an area of additional information AF notifying that a message has been received. When the user touches the activation area A, the controller 180 can perform an operation responding to the touch input of the user. For example, the display unit 151 including the inactivation area B can be entirely activated. Thus, the received message can be entirely displayed on the display unit 151.

Next, FIGS. 11 to 20 illustrate various examples of configuration of a light guide plate of the mobile terminal according to the embodiment of the invention. As shown in FIGS. 11 to 20, the mobile terminal 100 according to the embodiment of the invention can include a light guide plate 430. The light guide plate 430 guides light from light sources 450 to a particular area. For example, the light guide plate 430 can guide light from the light sources 450 to the activation area A. Thus, only the activation area A can be selectively illuminated.

Figure 11:
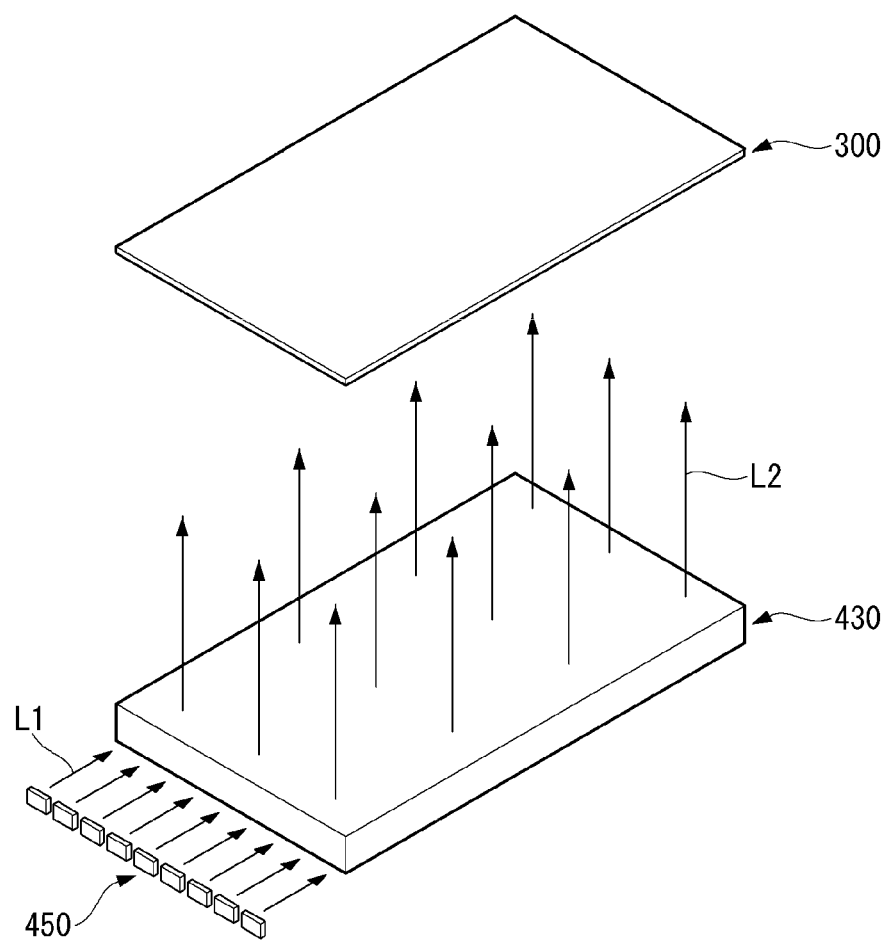
FIGS. 11 to 20 illustrate various examples of configuration of a light guide plate of a mobile terminal according to an embodiment of the invention.

As shown in FIG. 11, the light sources 450 are arranged on at least one side of the light guide plate 430 and operate in response to a control signal from the controller 180. Light from the light sources 450 can be totally reflected to the inside of the light guide plate 430 and be diffused to the entire surface of the light guide plate 430. The diffused light can be emitted toward a front surface of the light guide plate 430 and the emitted light can be finally emitted to the outside through a glass 300.

Figure 12:
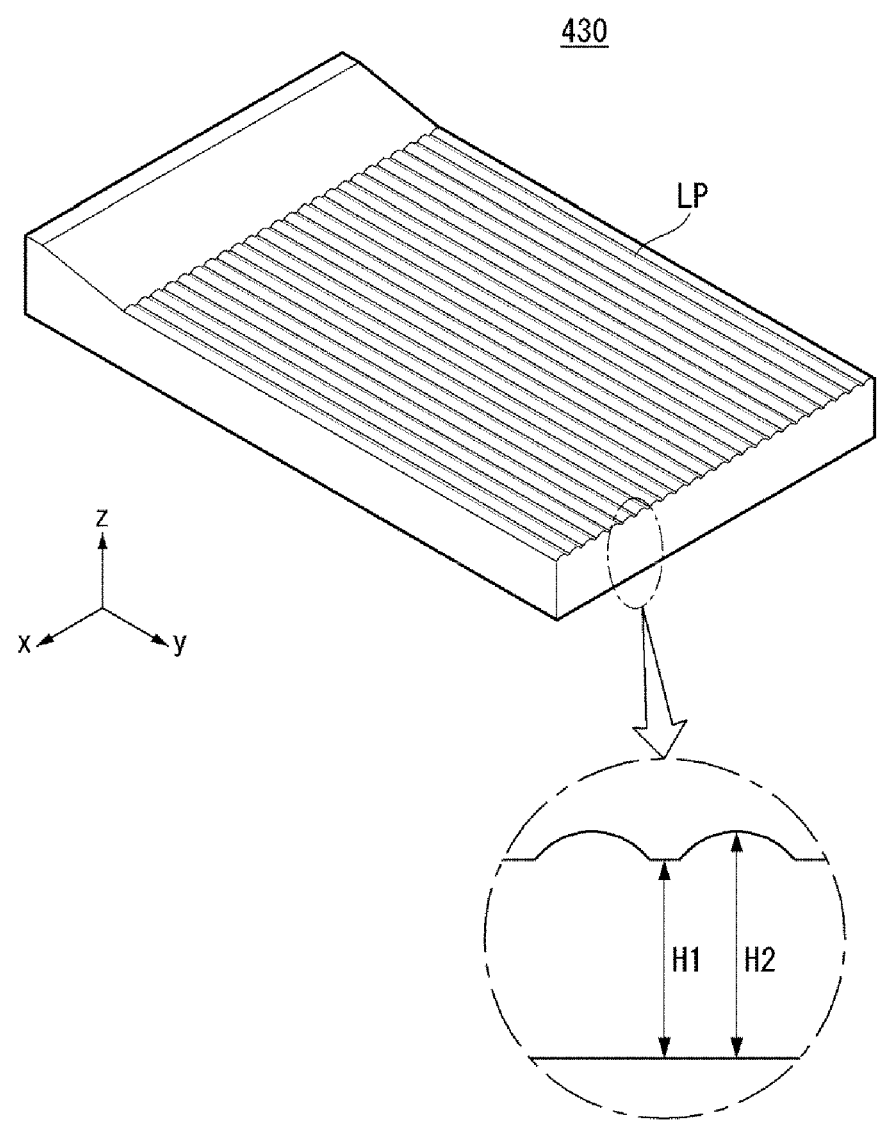

As shown in FIG. 12, the light guide plate 430 may have a pattern LP in a longitudinal direction of the light guide plate 430. For example, the pattern LP can be formed in a longitudinal direction of the mobile terminal 100. The pattern LP can be formed on one surface of the light guide plate 430. For example, the pattern LP can be formed on an upper surface of the light guide plate 430 or formed on a surface adjacent to the glass 300 among several surfaces of the light guide plate 430.

The pattern LP may be an uneven portion formed on at least a portion of the light guide plate 430. For example, the pattern LP may be an uneven portion formed on the upper surface of the light guide plate 430 in the longitudinal direction of the light guide plate 430. When the light guide plate 430 has a first height H1, the pattern LP has a second height H2 greater than the first height H1.

Figure 13:
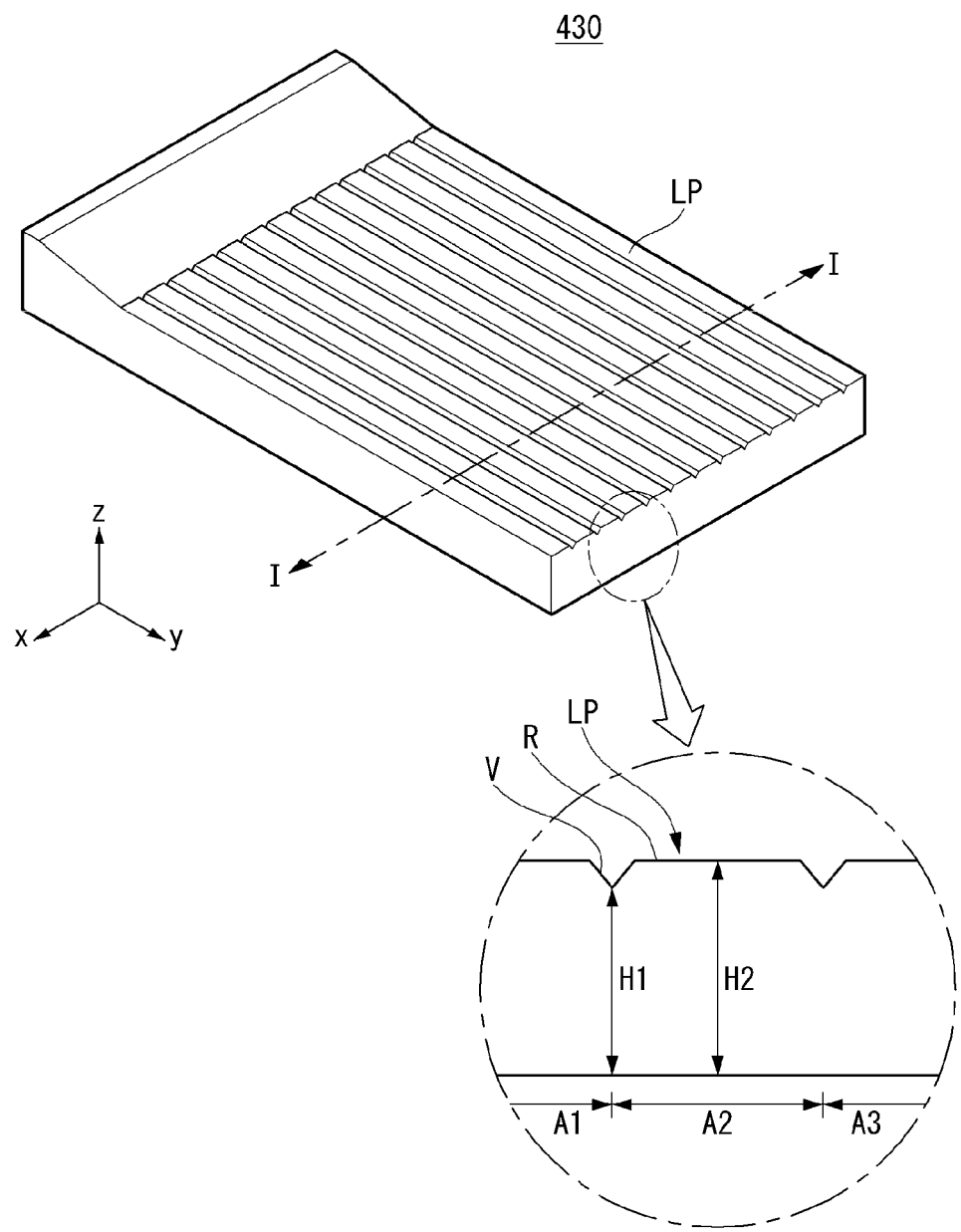

FIG. 13 is a cross-sectional view taken along line I-I of the light guide plate 430. As shown in FIG. 13, the pattern LP of the light guide plate 430 can include a valley V and a peak R. A distance from a bottom surface of the light guide plate 430 to the valley V may be measured as a first height H1, and a distance from the bottom surface of the light guide plate 430 to the peak R may be measured as a second height H2.

One pattern LP or a plurality of patterns LP can form a predetermined area. For example, a first area A1 and a second area A2 may be distinguished by the valley V, and the second area A2 and a third area A3 may be distinguished by the valley V. When the areas of the pattern LP are distinguished from each other, a diffusion area of light generated in the light sources 450 may be limited. For example, light entering the second area A2 may be diffused to the second area A2. Namely, the straight propagation of light along the pattern LP can be secured. In other words, light entering the second area A2 may not enter the first area A1 or the third area A3.

Figure 14:
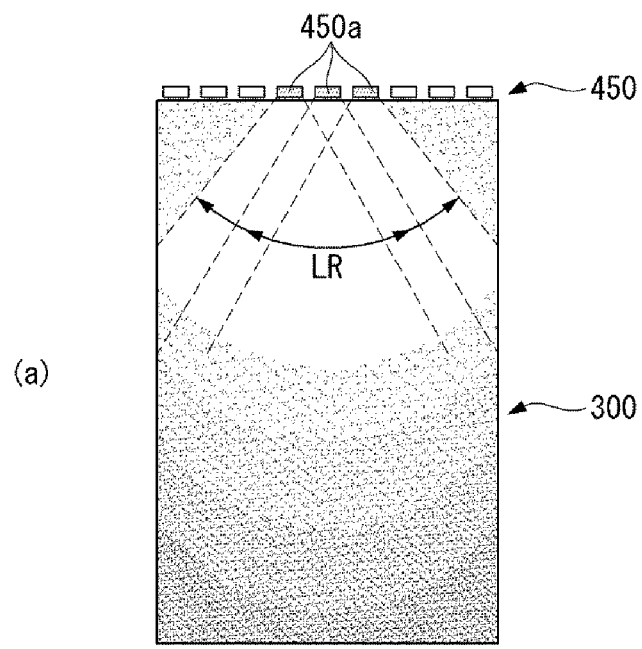
Figure 14:
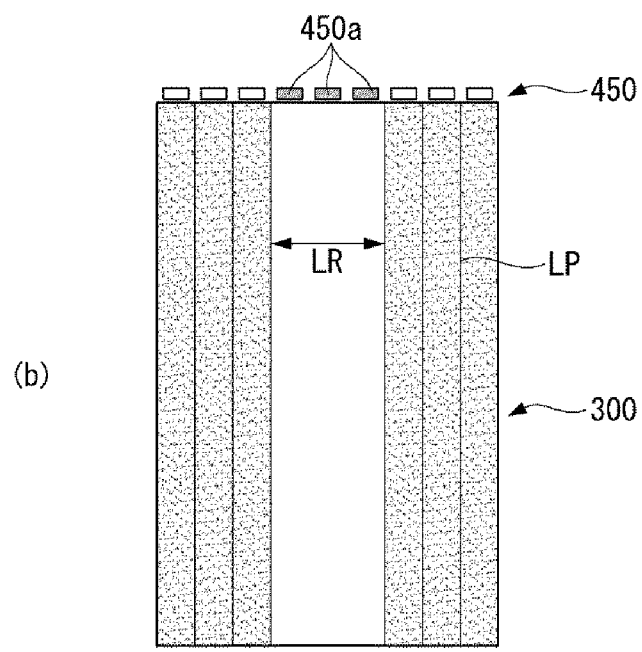

As shown in (a) of FIG. 14, a first light source 450*a* of the light sources 450 can be selectively turned on. The first light source 450*a* can include a plurality of light emitting diodes (LEDs). Light emitted from the turned-on first light source 450*a* can be propagated through a fan-shaped diffusion path LR. Namely, light of the first light source 450*a* can be entirely diffused to the glass 300 rather than selectively illuminating only a particular area. Thus, the first light source 450*a* can be suitable to selectively illuminate only the particular area.

As shown in (b) of FIG. 14, when the light guide plate 430 has a pattern LP, a propagation path of light may be affected by the pattern LP. For example, when the pattern LP is extended in a longitudinal direction of the mobile terminal 100, light emitted from the light sources 450 can be guided by the pattern LP and travel in the longitudinal direction of the mobile terminal 100. Thus, when the first light source 450*a* emits light, a diffusion path LR can travel toward a lower part of the first light source 450*a*.

Figure 15:
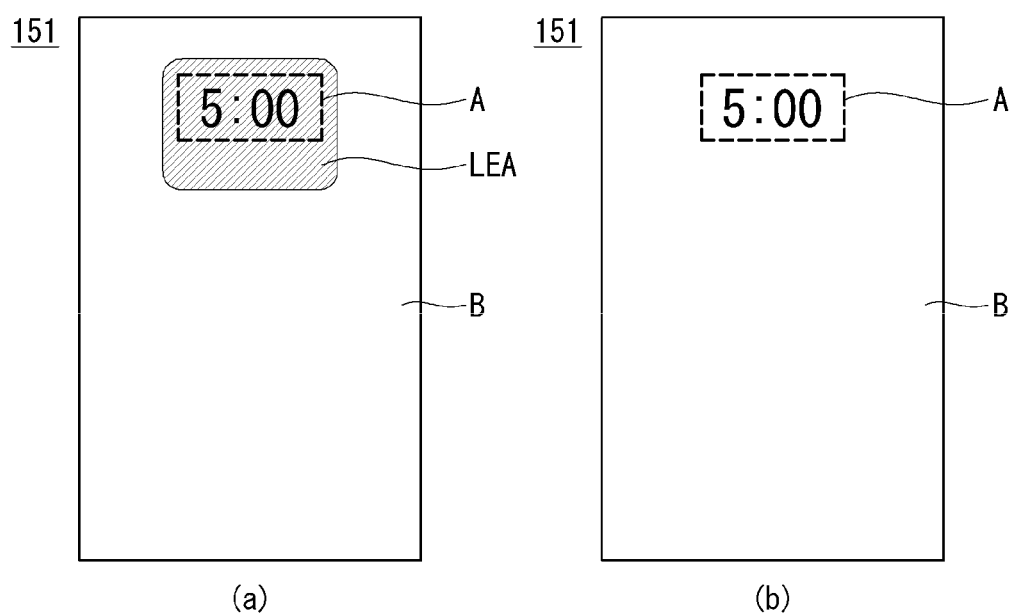

As shown in FIG. 15, the quality of lighting of the activation area A can vary depending on a diffusion path. In FIG. 15, (a) illustrates that a diffusion path LR has a radial shape as shown in (a) of FIG. 14. As shown in (a) of FIG. 15, when the diffusion path LR of the radial shape is formed, a diffusion area LEA including the activation area A can be generated. Namely, not only an area (for example, an area of a current time) requiring the lighting but also an ambient portion can be illuminated. Thus, when the diffusion area LEA is generated, the sensitive quality the user feels can be reduced.

In FIG. 15, (b) illustrates that a diffusion path LR has a straight shape as shown in (b) of FIG. 14. As shown in (b) of FIG. 15, when the diffusion path LR of the straight shape is formed, only the activation area A is illuminated. Thus, the quality the user feels is improved.

Figure 16:
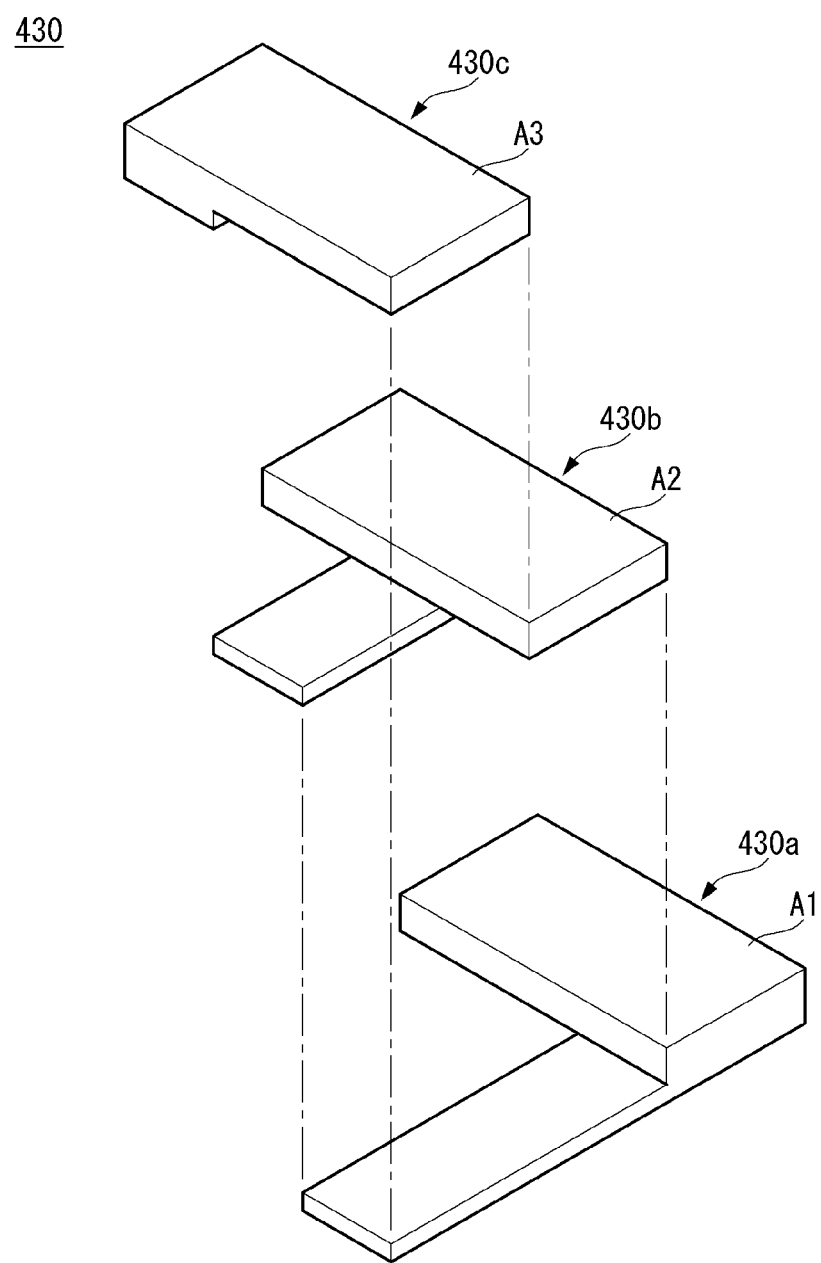
Figure 17:
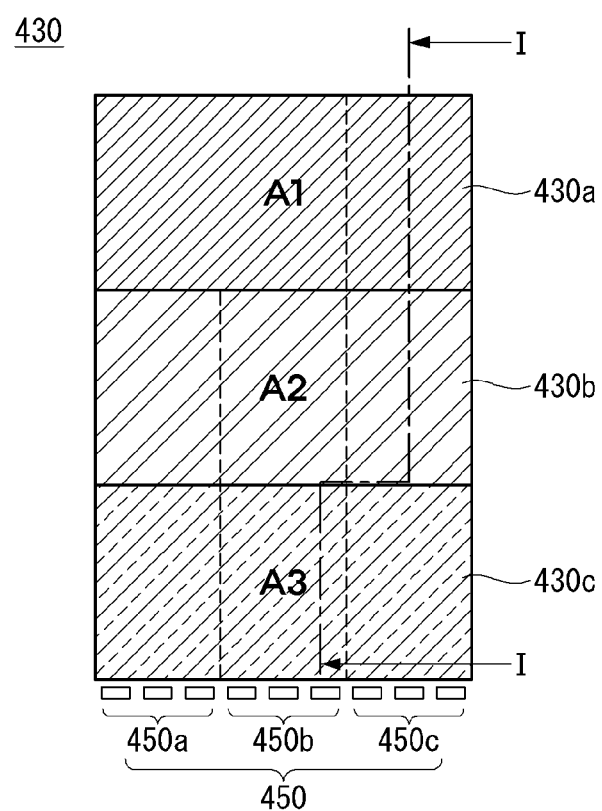
Figure 18:
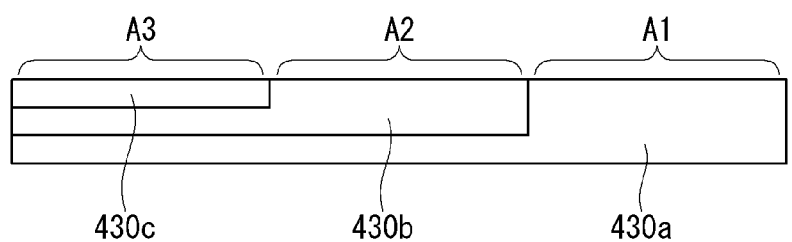

As shown in FIGS. 16 to 18, a light guide plate 430 according to another embodiment of the invention can be configured so that a particular area is selectively illuminated. As shown in FIGS. 16 to 18, the light guide plate 430 can include a plurality of areas. For example, the light guide plate 430 can include first to third light guide areas 430*a*, 430*b*, and 430*c*. The light guide areas 430*a*, 430*b* and 430*c* in FIG. 16 can correspond to separate light guide plates that are arranged together as shown to form the light guide plate 430. That is, the light guide plate is compartmentalized into a plurality of regions corresponding to the plurality of light guide portions as shown in FIGS. 16 to 18.

In more detail, the first to third light guide areas 430a, 430b, and 430c can overlap each other. For example, the second light guide area 430b can be positioned on the first light guide area 430a, and the third light guide area 430c can be positioned on the second light guide area 430b, thereby forming one light guide plate 430.

Light incident on the first to third light guide areas 430a, 430b, and 430c can be emitted through the first to third light guide areas 430a, 430b, and 430c, respectively. For example, light, that is incident on the first light guide area 430a through a third light source 450c, can be propagated through the first light guide area 430a and emitted to a first radiation portion A1 of a front surface of the first light guide area 430a. Further, light, that is incident on the second and third light guide areas 430b and 430c through second and first light sources 450b and 450a can be propagated through the second and third light guide areas 430b and 430c and emitted to second and third radiation portions A2 and A3 of front surfaces of the second and third light guide areas 430b and 430c.

Figure 19:
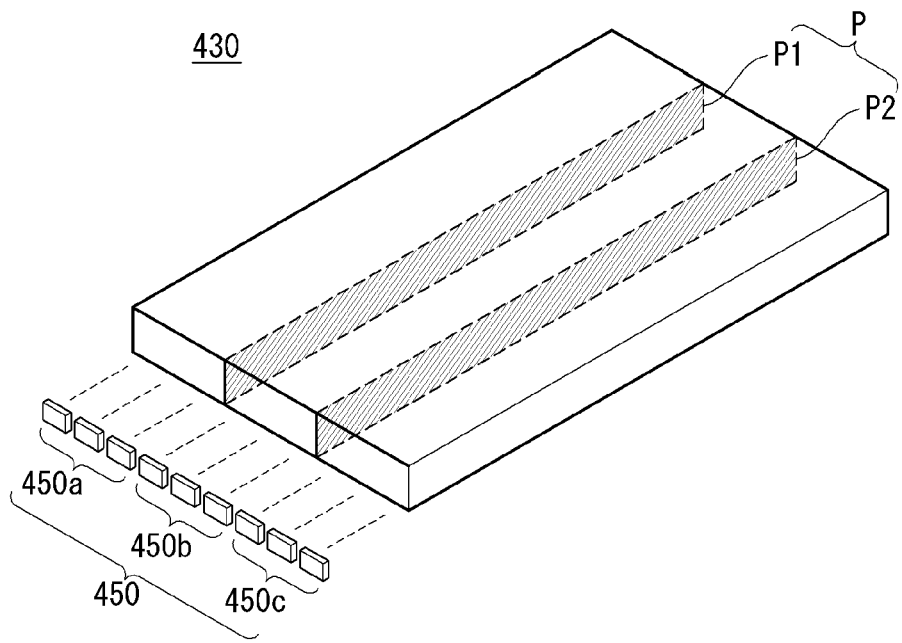

FIG. 19 illustrates a light guide plate 430 according to another embodiment of the invention. As shown in FIG. 19, the light guide plate 430 is not physically divided to form one body. That is, a light shielding plate P can be provided inside the light guide plate 430.

The light shielding plate P can segment the light guide plate 430 into a plurality of areas and the light shielding plate P and the light guide plate 430 form one body. For example, the light shielding plate P can be formed through insert injection molding.

A plurality of light shielding plates P can also be provided. For example, first and second light shielding plates P1 and P2 can be spaced apart from each other and positioned in parallel with each other. The first and second light shielding plates P1 and P2 prevent light of one area from being diffused to another area. For example, light emitted from a second light source 450b can travel between the first and second light shielding plates P1 and P2. Thus, the light guide plate 430 is compartmentalized into a plurality of regions by the light shielding plates P.

Figure 20:
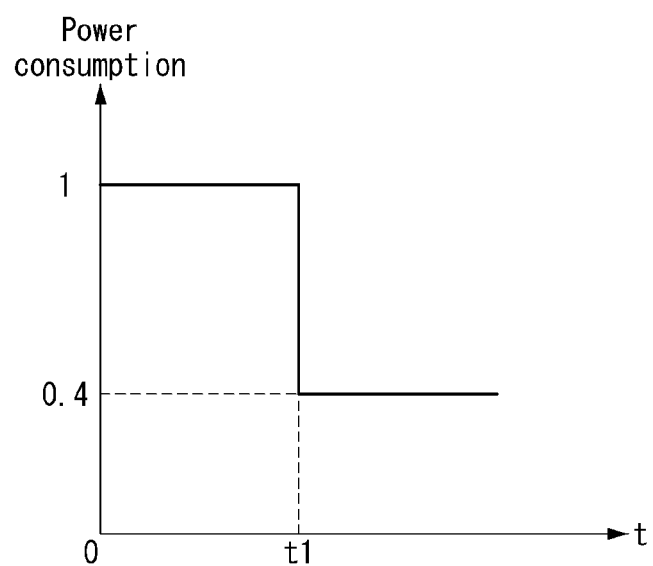

As shown in FIG. 20, the mobile terminal 100 according to the embodiment of the invention can reduce the power consumption. Namely, not an entire portion of the display unit 151 but a partial portion of the display unit 151 can be selectively illuminated, and thus power consumption can be further reduced compared to normal power consumption. In other words, because only some of light sources 450 operate, a necessary portion of the display unit 151 can be illuminated using lower power than the necessary power for all of the light sources 450 to operate.

According to an experiment, as an amount of normal power consumption is indicated as 1 in terms of operation of display, an amount of power consumption according to the embodiment of the invention indicates about 0.4. The amount of power indicated by about 0.4 was greater than an amount of power when the display unit 151 was turned off and was less than an amount of power when the display unit 151 was turned on. Thus, the user can check necessary minimum information (for example, a current time) of the mobile terminal 100 using lower power than the power when the display unit 151 is repeatedly turned on.

Figure 21:
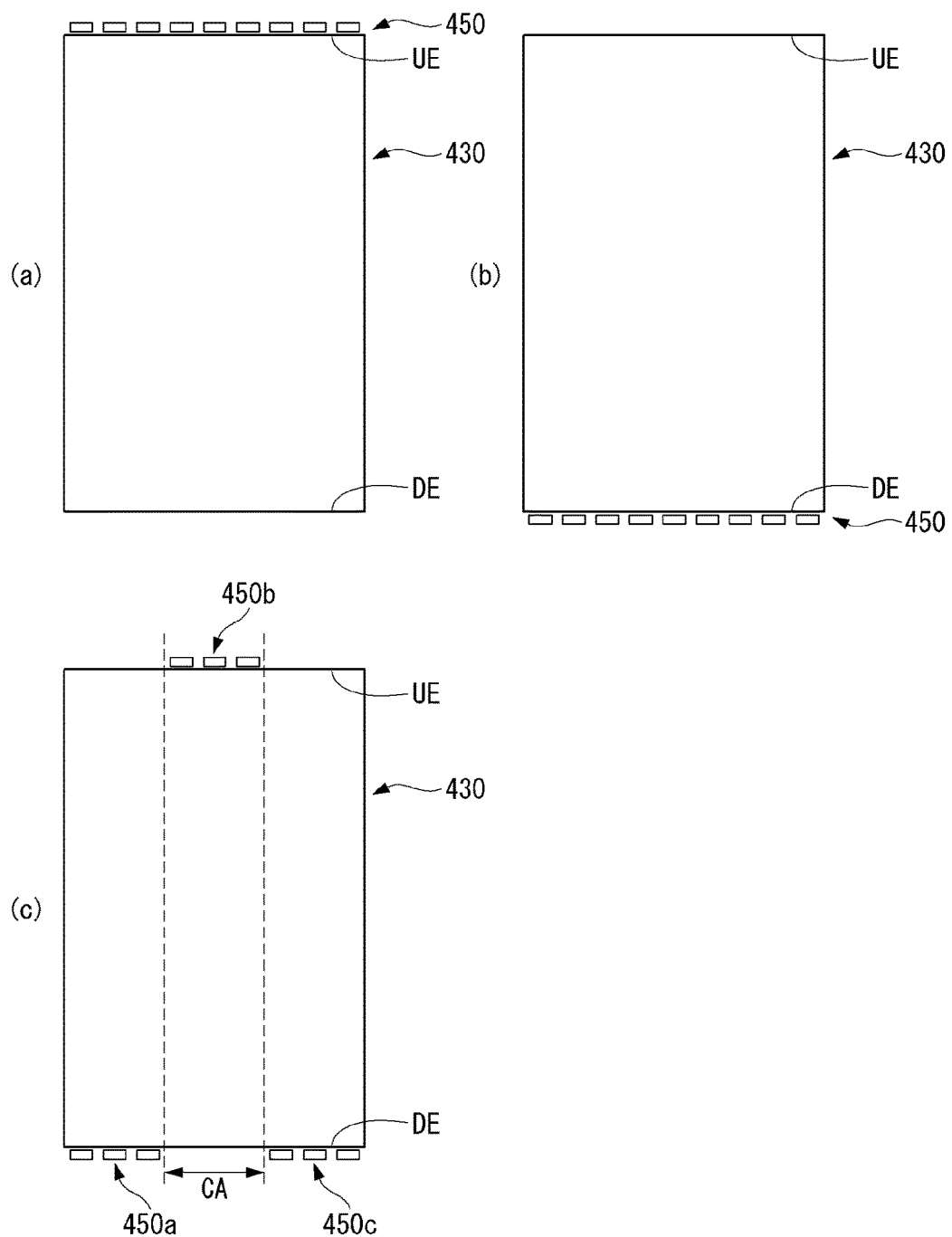
FIGS. 21 to 23 illustrate various examples of an arrangement of light sources of a mobile terminal according to an embodiment of the invention.
Figure 22:
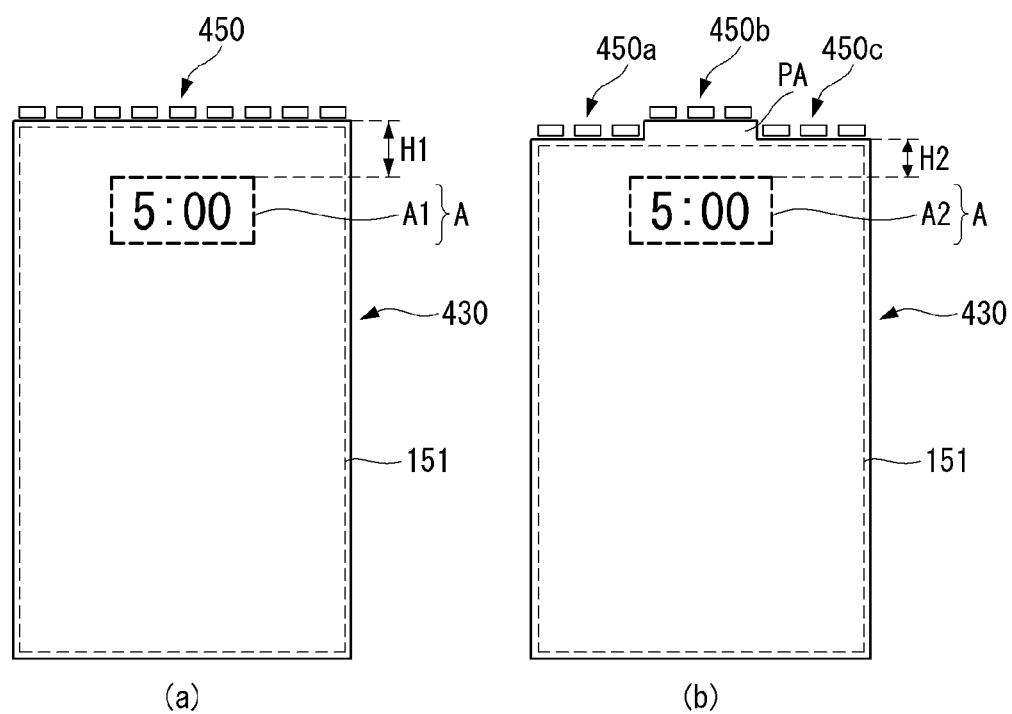
Figure 23:
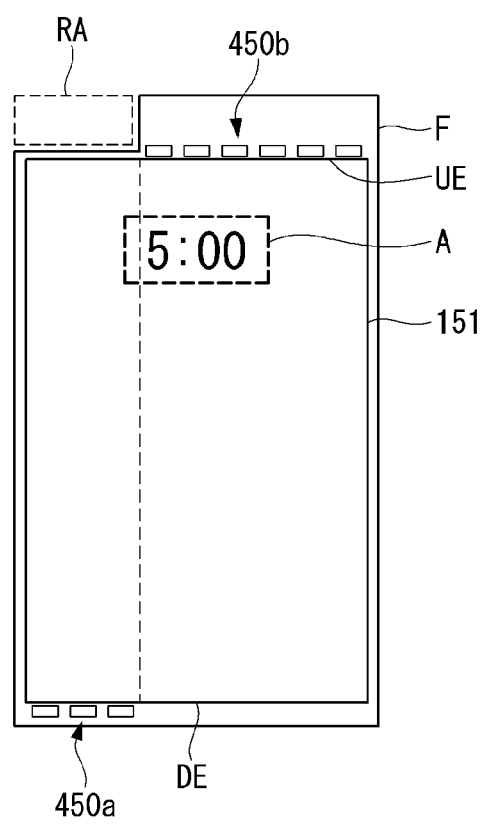

FIGS. 21 to 23 illustrate various examples of an arrangement of light sources of the mobile terminal according to the embodiment of the invention. As shown in FIGS. 21 to 23, the mobile terminal 100 according to the embodiment of the invention can change a location of light sources 450. For example, a location of at least a portion of the light sources 450 may be changed corresponding to an activation area A.

As shown in (a) of FIG. 21, the light sources 450 can be arranged at an upper side of a light guide plate 430. Namely, the light sources 450 may be positioned in an upper portion UE of the light guide plate 430 based on a longitudinal direction of the mobile terminal 100. The activation area A can be positioned at an upper side of the mobile terminal 100. For example, the activation area A can be provided at a location corresponding to about ⅓ to ⅕ of the display unit 151 from the top of the display unit 151 based on a longitudinal direction of the display unit 151. Thus, the light sources 450 can be arranged at the upper side of the mobile terminal 100 in order to selectively and efficiently illuminate the activation area A.

As shown in (b) of FIG. 21, the light sources 450 can be positioned in a lower portion DE of the light guide plate 430. The lower portion DE of the light guide plate 430 can have a bezel of a relatively large width. Thus, the lower portion DE can have a structure advantageous to mount components related to the light sources 450, etc.

As shown in (c) of FIG. 21, the light sources 450 can be dividedly disposed in the upper portion UE and the lower portion DE of the light guide plate 430. For example, first and third light sources 450a and 405c can be positioned in the lower portion DE of the light guide plate 430, and second light sources 450b can be positioned in the upper portion UE of the light guide plate 430. The second light sources 450b positioned in the upper portion UE can be adjacent to the activation area A. In other words, the second light sources 450b can be positioned corresponding to a central portion CA, in which the activation area A is positioned. An arrangement structure of the light sources 450 shown in (c) of FIG. 21 can efficiently illuminate the activation area A.

As shown in FIG. 22, a shape of the light guide plate 430 and/or a location of the light sources 450 can be changed so as to efficiently illuminate the activation area A. As shown in (a) and (b) of FIG. 22, the activation area A can be positioned at a first distance H1 or a second distance H2 from the top of the light guide plate 430. The second distance H2 can be less than the first distance H1. Namely, in a point of view of the user, the top of the light guide plate 430 can be closer to a second activation area A2 than a first activation area A1. This may be clearly understood when considering that the display unit 151 corresponds to a remaining portion except a protrusion PA protruding from the top of the light guide plate 430 upwards.

The light source 450 and the activation area A can be spaced apart from each other by a predetermined distance or more. That is, when considering that it is a distance necessary for forming an illuminance of a predetermined level or more, for diffusing light emitted from each light source 450, and for at the same time overlapping other light sources 450 adjacent to each light source 450.

Thus, when the second activation area A2 is displayed at a location close to the top of the display 151 as shown in (b) of FIG. 22, the second light source 450b corresponding to the second activation area A2 may need to upwardly move. The user can observe the display unit 151. Thus, in a point of view of the user, the top of the light guide plate 430 can be closer to the second activation area A2 than the first activation area A1.

As shown in FIG. 23, the first light source 450a and the second light source 450b may be disposed at different locations. For example, the first light source 450a can be disposed in the lower portion DE, and the second light source 450*b* can be disposed in the upper portion UE. A concave portion RA can be formed in the upper portion UE corresponding to the first light source 450*a* disposed in the lower portion DE. For example, at least a portion of a PCB F, on which various components required in an operation of the mobile terminal 100 are mounted, can be removed.

A camera module, etc. may be coupled to the concave portion RA. The camera module may be produced through a separate process. The camera module may become thicker because of a demand for a camera of a high performance, for example, a high resolution. Because the concave portion RA is formed by removing a portion of the PCB F, a thicker camera module than a related art can be used. The first light source 450*a* can be disposed in the lower portion DE due to the formation of the concave portion RA.

Figure 24:
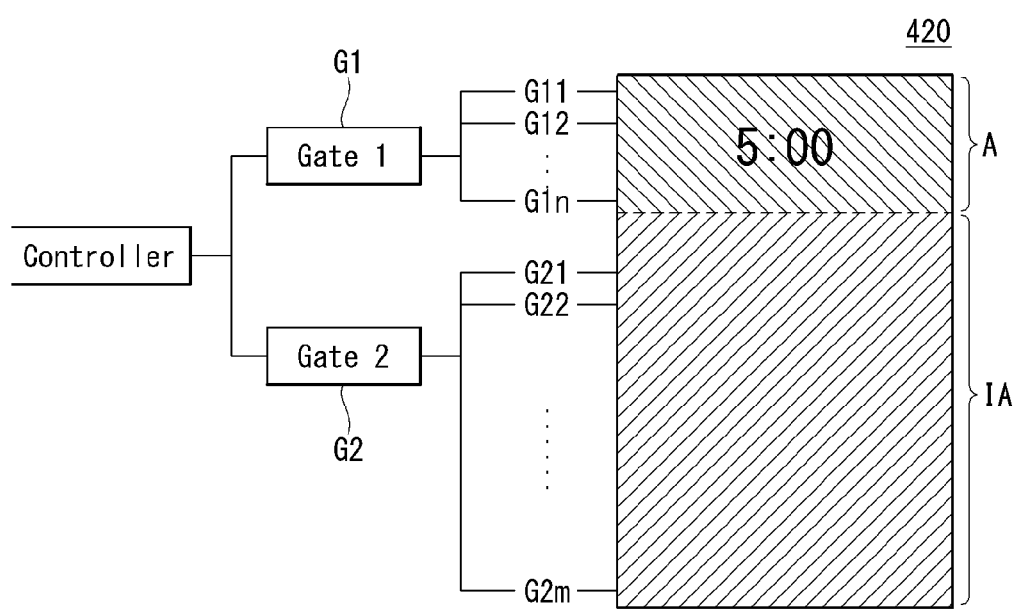
FIGS. 24 and 25 illustrate a gate configuration of a mobile terminal according to an embodiment of the invention.
Figure 25:
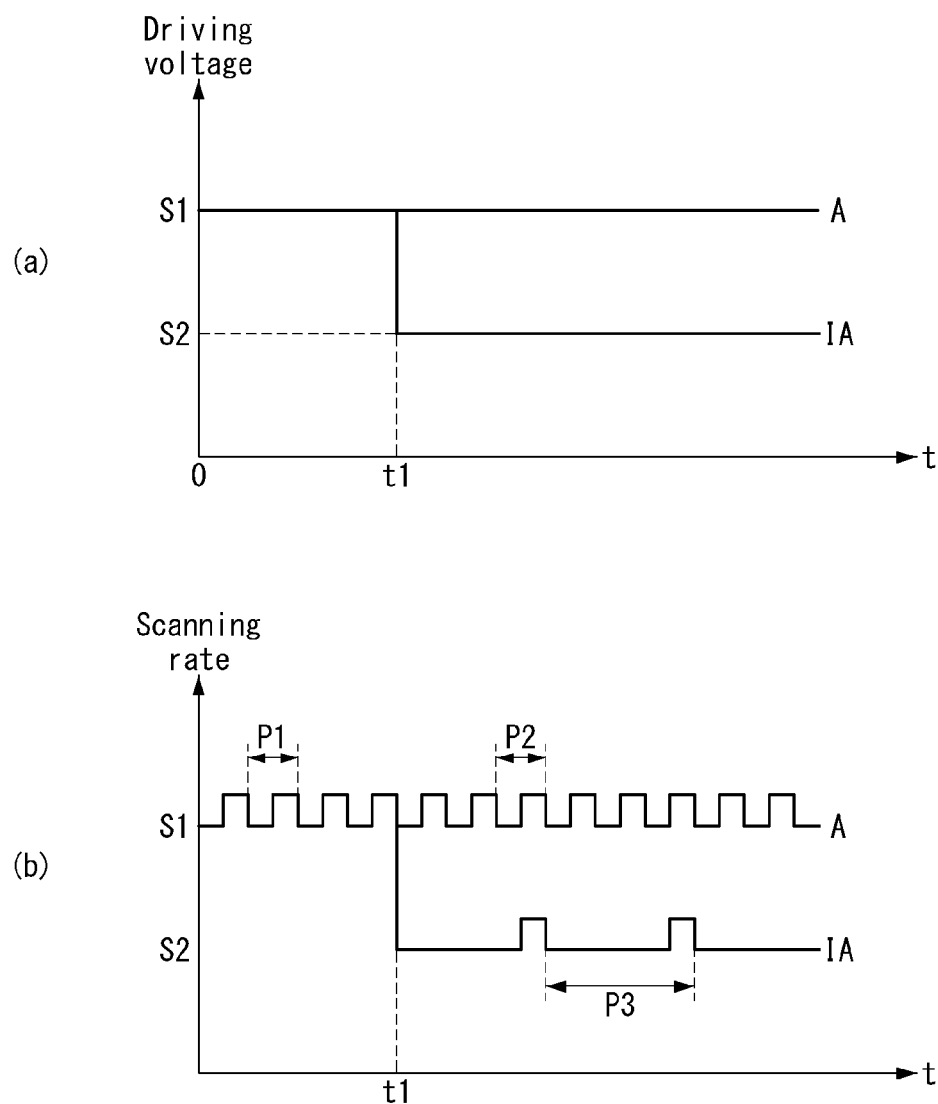

Next, FIGS. 24 and 25 illustrate a gate configuration of the mobile terminal according to the embodiment of the invention. As shown in FIGS. 24 and 25, the mobile terminal 100 according to the embodiment of the invention can include gates that are dividedly disposed in areas. The gate defines a path of a display signal input with respect to the display unit 151.

For example, the controller 180 can apply a control signal through the gate and the display unit 151 can display an image in response to the control signal applied through the gate. Thus, when the gate is turned off, the display unit 151 can be regarded as being turned off In a related art, when the display unit 151 was entirely turned off, the gate was entirely turned off. Thus, in the related art, when only a portion of the display unit 151 was used, the gate had to be entirely turned on. Hence, power consumption of a predetermined level had to be used regardless of a size of a displayed portion.

As shown in FIG. 24, the gates may include a first gate G1 and a second gate G2. The first gate G1 may correspond to an activation area A, and the second gate G2 may correspond to an inactivation area IA. The first gate G1 and the second gate G2 can separately receive a control signal from the controller 180. In other words, the first gate G1 and the second gate G2 can independently operate. For example, when the first gate G1 is turned on, the second gate G2 can be turned off. In another example, the first gate G1 can receive a signal at a first cycle, and the second gate G2 can receive a signal at a second cycle different from the first cycle. Namely, the first gate G1 and the second gate G2 can be physically separated.

Because the first gate G1 and the second gate G2 are separated, the controller 180 can dividedly operate the activation area A and the inactivation area IA. For example, the controller 180 can turn on the activation area A, on which an image is displayed, and turn off the inactivation area IA, on which the image is not displayed. Thus, electric power required to turn on the inactivation area IA, on which the image does not need to be displayed, can be saved. Hence, a loss of the electric power can be prevented.

As shown in FIG. 25, the first gate G1 and the second gate G2 may be controlled to be in different states. Thus, a resource of the mobile terminal 100 can be optimized and used. As shown in (a) of FIG. 25, a driving power may be in a first state S1. The driving power of the first state S1 can be changed at a time point t1. For example, the activation area A can maintain the first state S1, and the inactivation area IA can be changed to a second state S2.

The time point t1 may be a time at which only a portion of the display unit 151 is activated. For example, when an operation of the user is not input to the mobile terminal 100 for a predetermined period of time, or when the user changes a state of the mobile terminal 100 to a partial activation state, only the portion of the display unit 151 can be activated.

After the time point t1, a driving power of the activation area A can be different from a driving power of the inactivation area IA. For example, the activation area A can maintain the first state S1, and the inactivation area IA can be changed to the second state S2. Thus, because a driving power of a portion, on which an image does not need to be substantially displayed, can be reduced, the resource of the mobile terminal 100 can be more efficiently used.

As shown in (b) of FIG. 25, a scanning rate can be changed after the time point t1. For example, before the time point t1, both the activation area A and the inactivation area IA can display an image at a scanning rate of P1. After the time point t1 passed, the activation area A can display an image at a scanning rate of P2, and the inactivation area IA can display an image at a scanning rate of P3. A change in the scanning rate can change the frequency of image display operation of the display unit 151. When the frequency of image display operation decreases, power consumption can be reduced.

The scanning rates P1 and P3 can be different from each other. For example, the scanning rate P3 can be greater than the scanning rate P1. After the time point t1 passed, the scanning rate of the inactivation area IA can decrease. Namely, a display interval of images displayed on the inactivation area IA can increase. Ideally, stopping the scanning of the inactivation area IA can maximally save the resource of the mobile terminal 100. However, when the scanning of the inactivation area IA is stopped, the inactivation area IA can not be represented in pure black. Thus, the scanning rate of the inactivation area IA can be reduced to the extent that the inactivation area IA can be represented in pure black. Hence, the entire resource of the mobile terminal 100 can be saved.

The scanning rates P1 and P2 can be different from each other. For example, the scanning rate P2 can be greater than the scanning rate P1. Namely, after the time point t1 passed, the scanning rate of the activation area A can decrease. The activation area A can be an area, in which minimum information, for example, a clock is displayed. Thus, an image to be displayed on the activation area A can be a still image rather than a dynamic image. Thus, even when the scanning rate of the activation area A decreases to a predetermined level, the user cannot feel a reduction in quality of an image to be displayed on the activation area A.

The scanning rates P1 and P2 can be equal to each other. Namely, there can be no change in the scanning rate of the activation area A before and after the time point t1. Even when the scanning rates P1 and P2 are equal to each other, consumption of the entire resource of the mobile terminal 100 after the time point t1 can be less than that before the time point t1 because the scanning rate P3 is greater than the scanning rate P1.

Figure 26:
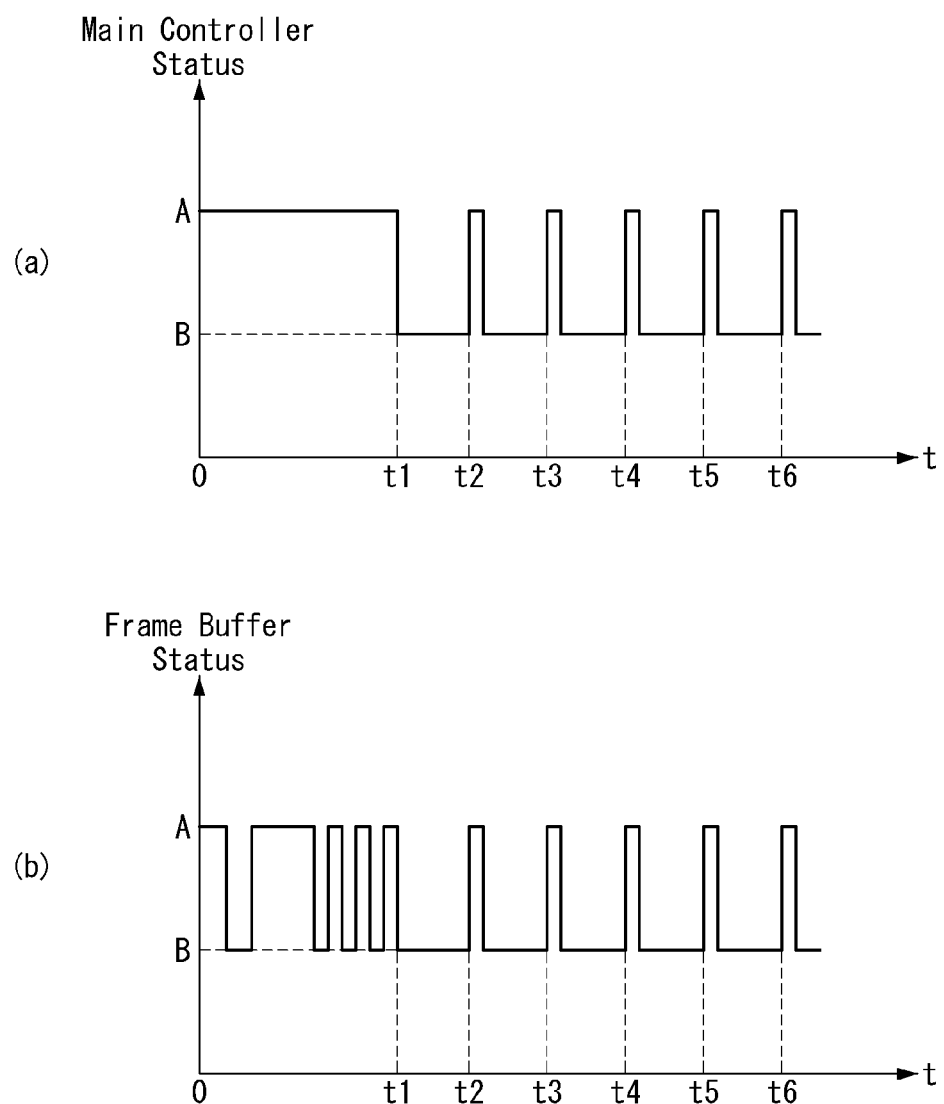
FIGS. 26 to 28 illustrate an operation of a mobile terminal according to an embodiment of the invention.
Figure 27:
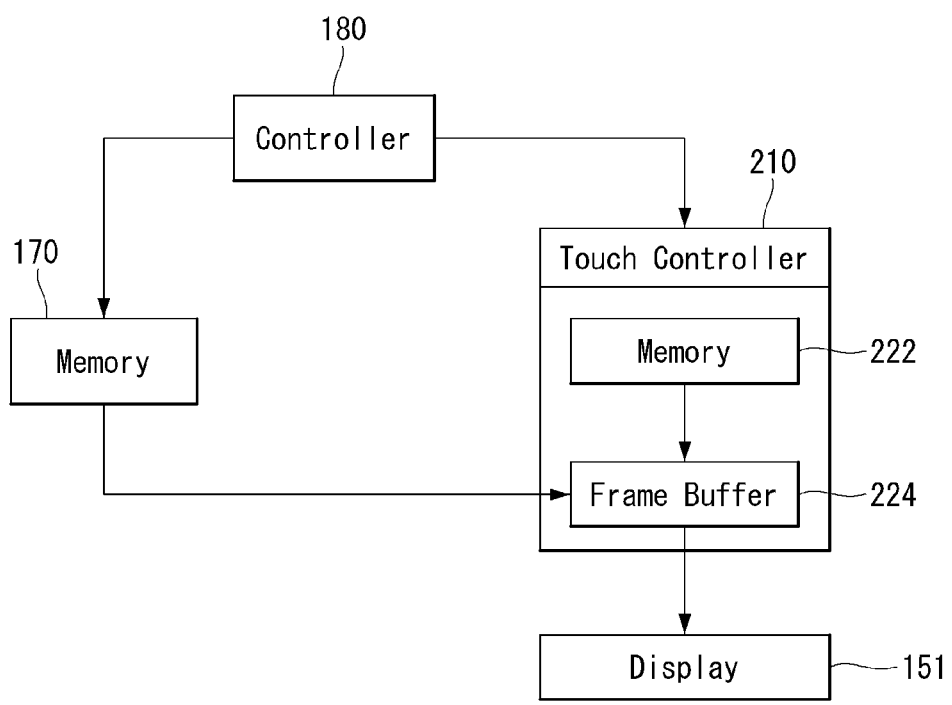
Figure 28:
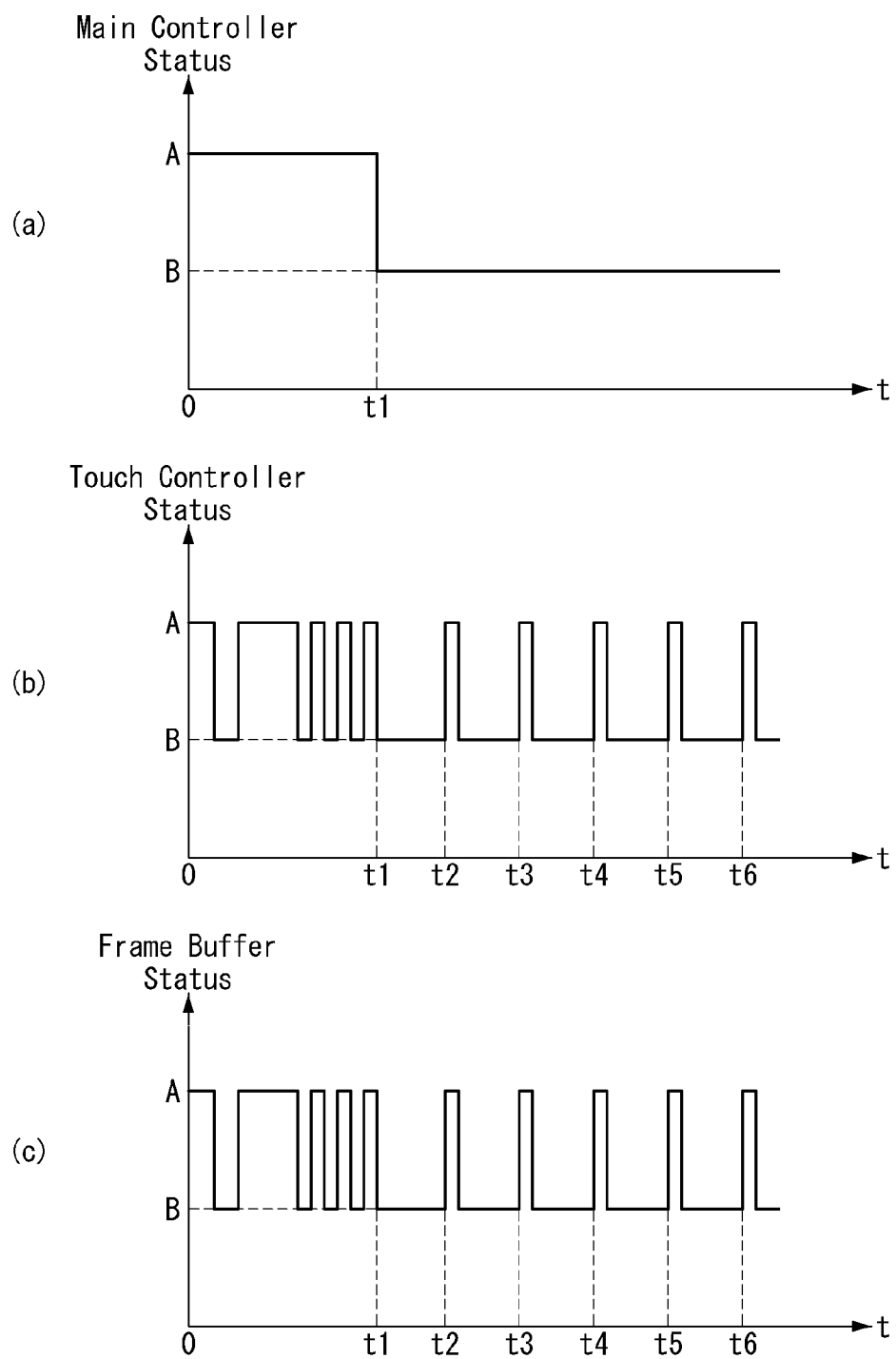

FIGS. 26 to 28 illustrate an operation of the mobile terminal according to the embodiment of the invention. As shown in FIGS. 26 to 28, the mobile terminal 100 according to the embodiment of the invention can reduce consumption of a resource by minimizing an operation of the controller 180 after a particular time point.

As shown in FIG. 26, even when the controller 180 enters into a mode, in which only a portion of the display unit 151 is activated, the controller 180 has to be generally activated in a predetermined cycle. For example, the mobile terminal 100 can enter into a mode, in which only a portion of the display unit 151 is activated and minimum information is displayed on the display unit 151, at a time point t1.

Even when the mobile terminal 100 enters into a mode, in which only a portion of the display unit 151 is activated, there may be a necessity that the mobile terminal 100 has to update an image on an activation area A at predetermined time interval. For example, as the mobile terminal 100 displays a clock on the activation area A, an image (indicating "minute") displayed on the activation area A has to be changed every minute (in FIG. 26, at time points t2, t3, t4, t5, and t6).

An activation of the controller 180 can be related to a status of a frame buffer showing a status of data to be displayed on the display unit 151. For example, in order to input and/or output data to the frame buffer, the controller 180 can be activated corresponding to the input and/or the output of data.

When the controller 180 is activated, a resource of the mobile terminal 100 including power consumption may be consumed. The mobile terminal 100 according to the embodiment of the invention can reduce the consumption of the resource by minimizing the activation of the controller 180.

As shown in FIG. 27, the controller 180 can control an entire operation of the mobile terminal 100. For example, the controller 180 can control the memory 170 and/or a touch controller 210.

The touch controller 210 may be configured separately from a main controller (i.e., the controller 180). The touch controller 210 may be a display driver integrated circuit (IC). Namely, the touch controller 210 may be physically configured separately from the controller 180. The touch controller 210 may operate based on a control signal of the controller 180. The touch controller 210 may operate separately from the controller 180 in a state where an activation area A is displayed. For example, when the controller 180 is in an inactivation state, the touch controller 210 may display an image on the activation area A.

The touch controller 210 may include a touch memory 222. The touch memory 222 may store minimum data to be displayed on the activation area A. For example, the touch memory 222 may store data displaying changes in hour, minute, and second.

When the activation area A is first displayed, the touch controller 210 may receive a portion of data to be displayed on the activation area A from the memory 170. Data received from the memory 170 and data of the touch memory 222 may be transmitted to a frame buffer 224, and an image corresponding to the data can be displayed on the display unit 151.

After the mobile terminal 100 enters into a mode, in which only a portion of the display unit 151 is activated, and obtains a necessary image, the mobile terminal 100 does not need to obtain an additional control signal from the controller 180. Namely, after the mobile terminal 100 enters into the mode, in which only a portion of the display unit 151 is activated, the controller 180 can enter into a sleep state and then maintain the sleep state.

Even when the controller 180 maintains the sleep state, the touch controller 210 may obtain data, required to display changes in the activation area A, from the touch memory 222. For example, a minimum image required to display changes in hour, minute, second, etc. may be stored in the touch memory 222. The image obtained from the touch memory 222 can be displayed on the display unit 151 via the frame buffer 224.

As shown in (a) of FIG. 28, a status of the controller 180 can be changed after a time point t1. For example, the controller 180 can be changed from an activation state to a sleep state. After the controller 180 of the mobile terminal 100 according to the embodiment of the invention is changed from the activation state to the sleep state, the controller 180 does not need to be again changed to the activation state. Namely, because the touch controller 210 performs an operation necessary for a display of the activation area A after the time point t1, the controller 180 does not need to operate.

As shown in (b) of FIG. 28, the touch controller 210 may be selectively activated at a predetermined time point after the time point t1. For example, when a clock is displayed on the activation area A, an image indicating "minute" in the clock may be changed every minute (in FIG. 28, at time points t2, t3, t4, t5, and t6). As shown in (c) of FIG. 28, the frame buffer 224 may be filled with data received from the touch controller 210 in a predetermined unit. For example, the frame buffer 224 may be filled with image data displaying changes in the activation area A.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

The foregoing embodiments are merely examples and are not to be considered as limiting the present disclosure. The present teachings can be readily applied to other types of methods and apparatuses. The features, structures, methods, and other characteristics of the embodiments described herein may be combined in various ways to obtain additional and/or alternative embodiments.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a display;
   a light guide plate positioned on a rear of the display, the light guide plate providing the display with light, and including a first edge and a second edge opposite the first edge; and
   a plurality of light sources facing the first edge of the light guide plate, wherein the light guide plate includes:
a plurality of front layers positioned on the rear of the display, the plurality of front layers being disposed from the first edge to the second edge; and
a plurality of rear layers positioned at a rear of the plurality of front layers, each of the plurality of rear layers corresponding to each of the plurality of front layers, each of the plurality of front layers being extended from each of the plurality of rear layers to the first edge, and the plurality of rear layers being provided with the light from the plurality of light sources.

2. The mobile terminal of claim 1, further comprising a controller configured to:
control the display to operate in one of operation states including a first state, in which all of the plurality of light sources are activated such that an entire portion of the display is illuminated, and a second state, in which at least one light source corresponding to a partial portion of the display among the plurality of light sources is selectively activated such that the partial portion of the display is illuminated, and a dimming state in which at least a portion of the plurality of light sources is inactivated such that the entire portion of the display is dimmed, and
control the display to be in the second state when a predetermined period of time passes from a start of the dimming state.

3. The mobile terminal of claim 2, wherein the controller is further configured to display a clock image on the partial portion of the display in the second state.

4. The mobile terminal of claim 3, wherein the clock image includes information of current time.

5. The mobile terminal of claim 4, wherein the controller is configured to shift the partial portion of the display in accordance with the information of current time.

6. The mobile terminal of claim 5, wherein the controller is configured to shift the partial portion of the display when the current time coincides with a predetermined time.

7. The mobile terminal of claim 2, wherein the partial portion of the display is positioned adjacent to the first edge.

8. The mobile terminal of claim 2, wherein the display comprises:
a first gate corresponding to the partial portion of the display; and
a second gate corresponding to the remaining portion of the display, and
wherein the controller is further configured to apply a control signal to the first gate and the second gate to illuminate the entire portion of the display in the first state, and apply a control signal to the first gate to illuminate the partial portion of the display and not apply a control signal to the second gate so the remaining portion of the display is not illuminated in the second state.

9. The mobile terminal of claim 2, further comprising:
a touch controller including a touch memory and a frame buffer,
wherein the touch controller is configured to display an image on the partial portion of the display in the second state while the controller is inactivated.

10. The mobile terminal of claim 9, wherein the touch controller is configured to display an image on the partial portion of the display based on an image stored in the touch memory.

11. The mobile terminal of claim 9, wherein the touch controller is configured to display an image on the partial portion of the display at a predetermined time interval.

12. The mobile terminal of claim 2, wherein the display includes a touch sensor,
wherein the controller is configured to:
control a partial portion of the touch sensor to be activated, and control a remaining portion excluding the partial portion of the touch sensor to be inactivated, in the second state, and
wherein the partial portion of the touch sensor corresponds to the partial portion of the display.

13. The mobile terminal of claim 1, wherein the light guide plate includes an uneven pattern on a front surface of the light guide plate in a direction from the first edge to the second edge.

14. The mobile terminal of claim 13, wherein the uneven pattern includes a plurality of valleys formed on the surface of the light guide plate.

15. The mobile terminal of claim 14, wherein the plurality of valleys face the display.

16. The mobile terminal of claim 15, wherein each of the plurality of valleys is elongated.

17. The mobile terminal of claim 16, wherein each of the plurality of valleys is concave toward the display.

18. The mobile terminal of claim 1, wherein the plurality of rear layers are disposed along the first edge.

19. The mobile terminal of claim 18, wherein the plurality of rear layers have lengths different from each other with respect to the first edge.

20. The mobile terminal of claim 19, wherein a front surface of the light guide plate is compartmentalized into a plurality of regions corresponding to the plurality of front layers.

21. The mobile terminal of claim 1, wherein the light guide plate includes at least one light shielding plate, and
wherein the at least one light shielding plate is placed alternatively with the plurality of front layers.

22. The mobile terminal of claim 21, wherein the at least one light shielding plate is formed through insert molding.

23. The mobile terminal of claim 1, wherein the plurality of light sources include a plurality of comparted light sources.

24. The mobile terminal of claim 23, wherein the plurality of comparted light sources correspond to the plurality of rear layers.

* * * * *